(12) United States Patent
Moriya et al.

(10) Patent No.: US 7,329,299 B2
(45) Date of Patent: Feb. 12, 2008

(54) PLATE-SHAPED WORK PIECE TRANSPORTING APPARATUS

(75) Inventors: Susumu Moriya, Shiga-ken (JP); Shigeto Murayama, Shiga-ken (JP); Yuichi Morimoto, Shiga-ken (JP); Yoshiteru Ikehata, Shiga-ken (JP); Takayoshi Ono, Shiga-ken (JP)

(73) Assignee: Daifuku Co., Ltd., Osaka (JP)

( * ) Notice: Subject to any disclaimer, the term of this patent is extended or adjusted under 35 U.S.C. 154(b) by 487 days.

(21) Appl. No.: 10/885,210

(22) Filed: Jul. 6, 2004

(65) Prior Publication Data

US 2005/0005583 A1 Jan. 13, 2005

(30) Foreign Application Priority Data

Jul. 8, 2003 (JP) ............................. 2003-271946
Sep. 18, 2003 (JP) ............................. 2003-326284

(51) Int. Cl.
*B65G 49/07* (2006.01)

(52) U.S. Cl. .................. 55/385.6; 406/83; 406/88; 406/89; 406/154; 414/935; 414/936; 414/939

(58) Field of Classification Search ................ 414/935, 414/936, 939; 406/83, 89, 88, 154; 55/385.6
See application file for complete search history.

(56) References Cited

U.S. PATENT DOCUMENTS

| 6,368,393 B1 * | 4/2002 | Hironaka ..................... 96/111 |
| 6,676,365 B2 * | 1/2004 | Adam et al. .................. 406/83 |
| 2005/0066633 A1 * | 3/2005 | Jang et al. ................. 55/385.2 |

FOREIGN PATENT DOCUMENTS

| JP | 2002-151571 A | 11/2000 | |
| JP | 2002-289670 A | 3/2001 | |
| JP | 2002-151571 | * 5/2002 | ............... 414/935 |
| JP | 2002-308421 A | 10/2002 | |
| JP | 2002-308423 A | 10/2002 | |
| JP | 2002-321820 A | 11/2002 | |

* cited by examiner

*Primary Examiner*—Minh-Chau T. Pham
(74) *Attorney, Agent, or Firm*—The Webb Law Firm

(57) ABSTRACT

It is an object of the present invention to provide a plate-shaped work piece transporting apparatus that has a fan, a dust-removal filter disposed above this fan, and a plate-shape porous member disposed above the dust-removal filter. By forming a chamber in which air can accumulate between the porous member and the dust-removal filter, it is possible to suppress air pulsations. Further, by providing support members on the porous member, the plate-shaped work piece can be supported and damage thereto can be avoided when the plate-shaped work piece, which is supported by air from the fan, drops to below a set height.

18 Claims, 21 Drawing Sheets

PLATE-SHAPED WORK PIECE TRANSPORTING APPARATUS

BACKGROUND OF THE INVENTION

A plate-shaped work piece transporting apparatus disclosed in JP 2002-321820A, for example, is used to carry plate-shaped work pieces such as glass substrates for liquid crystal, and is provided with drive force application means having a drive rotor that applies a drive force in the transporting direction while supporting both end portions of the plate-shaped work piece in a contacting manner. Both end portions of the plate-shaped work piece are supported by the drive force application means in a contacting manner, with the intermediate portion thereof supported by a air-supplying-type support means. Blowing-type support means is also provided. This is provided with numerous air ejection portions provided at a predetermined spacing along the route over which the plate-shaped work piece is transported, and a supply source including a compression pump or the like. The supply source and the air ejection portions are connected by a supply duct such that compressed air from the supply source is distributively supplied to the numerous air ejection portions. The plate-shaped work piece is contactlessly supported by supplying compressed air ejected from the air ejection portions between both end portions of the plate-shaped work piece.

In an apparatus for transporting a plate-shaped work piece in a vertical or near vertical orientation disclosed in JP 2002-308423A, for example, the drive force application means applying drive force in the transporting direction is provided with a drive rotor supporting a lower end portion of the plate-shaped work piece in a contacting manner while applying a drive force. One of the end portions is supported in a contacting manner by the drive force application means, whereas an intermediate portion of the plate-shaped work piece transported in a vertical or near vertical orientation is supported by the air-supplying-type support means. The air-supplying-type support means is provided with numerous air ejection portions at a predetermined spacing along the path over which the plate-shaped work piece is transported, and a supply source including an air blower, for example. The supply source and the air ejection portions are connected by a supply duct such that compressed air from the supply source is distributively supplied to the numerous air ejection portions. Compressed air ejected from the air ejection portions is supplied onto an intermediate portion of the plate-shaped work piece, contactlessly supporting the plate-shaped work piece.

With plate-shaped work piece transporting apparatuses of the prior art described above, when a pulsation occurs in which the amount of compressed air from the supply source occasionally varies, a pulsation also occurs in the compressed air supplied toward the lower surface of the plate-shaped work piece, resulting in the problem that the intermediate portion of the plate-shaped work piece to which the air is supplied moves up and down and a large load is applied to the plate-shaped work piece.

Further, with conventional plate-shaped work piece transporting apparatuses, when the amount of purified air that is supplied is reduced due to some abnormality with the air-supplying-type support means, the transported object drops below the predicted height at which it is supported by the air-supplying-type support means due to the drop in force supporting the transported object, resulting in a high probability that the transported object will come into contact with the air-supplying-type support means positioned below it and either the transported object itself or the air-supplying-type support means will be damaged.

Moreover, with conventional plate-shaped work piece transporting apparatuses, both ends of the transported object are supported in a contacting manner by the drive force application means, and thus when the supporting force of the air-supplying-type support means drops, the intermediate portion of the transported object is lowered and this causes it to bend and become deformed, and there is a high probability that this deformation will damage the transported object This is particularly noticeable when transporting plate-shaped work pieces such as glass substrates for liquid crystal as the transported object.

SUMMARY OF THE INVENTION

It is an object of the present invention to provide a plate-shaped work piece transporting apparatus with which pulsations in the air supplied to the lower surface of the plate-shaped work pieces can be suppressed so as to reduce the load applied to the plate-shaped work pieces.

It is a further object of the present invention to provide a transporting apparatus with which, even if the transported object falls due to a drop in the supporting force of the air-supplying-type support means, the amount that the transported object falls can be reduced so as to lower the risk of damage to the transported object and the air-supplying-type support means.

The transporting apparatus according to the present invention is provided with a dust-removal filter for removing dust, air-supplying means for supplying purified air toward the lower surface of the plate-shaped work piece through the dust-removal filter, and a screening member for allowing passage of purified air that has passed through the dust-removal filter and for serving as a shield that prevents foreign bodies from falling toward the dust-removal filter, wherein a chamber in which the purified air accumulates is formed between the screening member and the dust-removal filter. The air supplied by the air-supplying means accumulates in this chamber, and due to the cushioning action of this air, pulsations that are generated can be suppressed.

Furthermore, a transporting apparatus according to another feature of the present invention is provided with air-supplying-type support means for supplying purified air toward a lower surface of a plate-shaped object to be transported so as to contactlessly support the transported object, and contact-type support means for supporting above an upper surface of the air-supplying-type support means a transported object that has been lowered to below a set height at which it is supported by the air-supplying-type support means. Due to the support means, a transported object can be supported from below even if it drops below a predetermined height, allowing the risk that the transported object or the transporting apparatus will be damaged to be made even smaller.

DETAILED DESCRIPTION OF THE PREFERRED EMBODIMENTS

A plate-shaped work piece transporting apparatus of the present invention is described below using the drawings. A glass substrate for liquid crystal is used as an example of the plate-shaped work piece, but the plate-shaped work piece is not limited to this.

Figure 1:
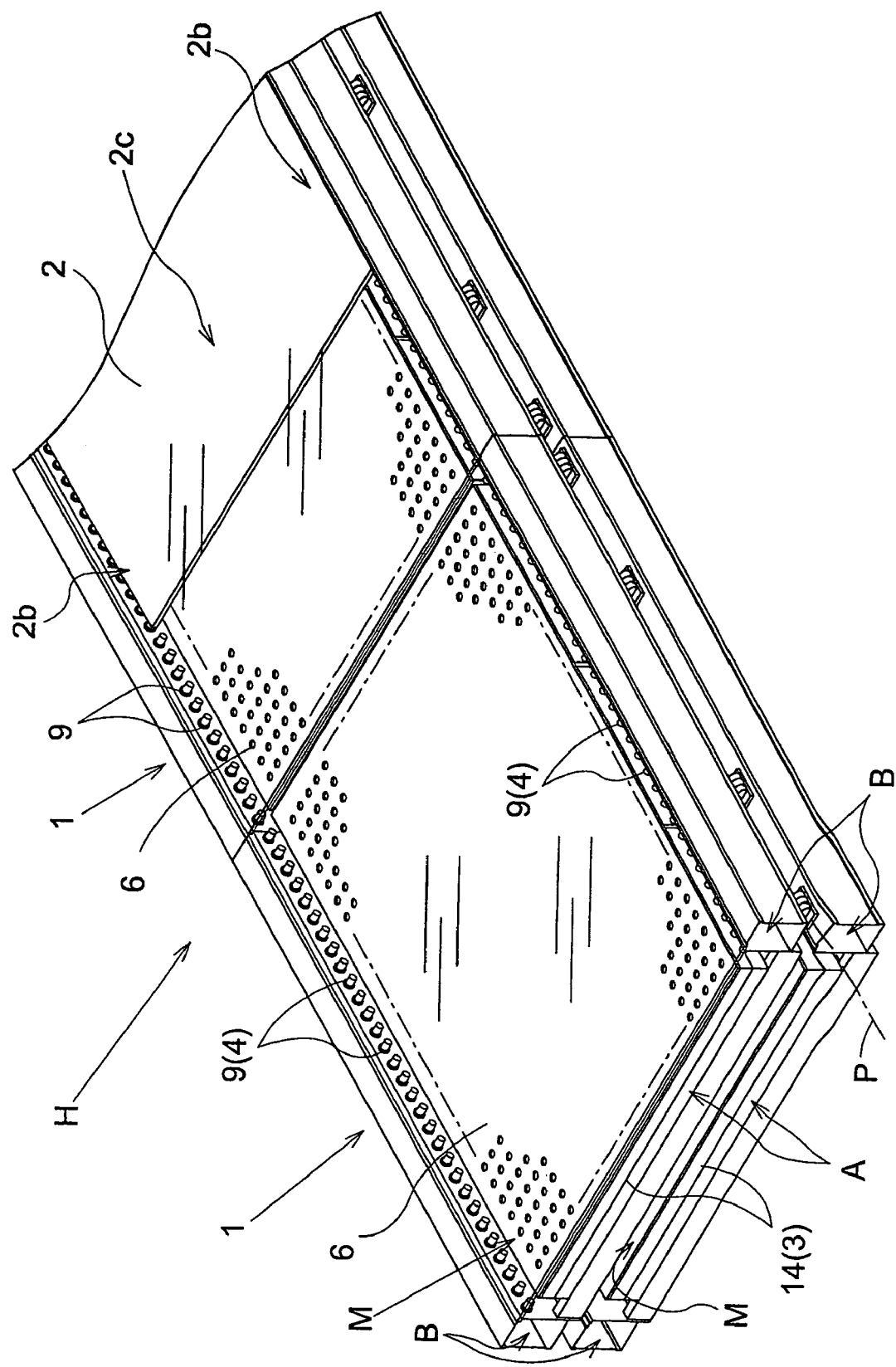
FIG. 1 is a perspective view of a plate-shaped work piece transporting apparatus.

As shown in FIG. 1, the plate-shaped work piece transporting apparatus H has a plurality of plate-shaped work piece transporting units 1 arranged in a line in the transporting direction of a glass substrate 2. The glass substrate 2 transported on the plate-shaped work piece transporting units 1, which are positioned on the upper transporting side, is supported by air-supplying-type support means 3 and drive force application means 4 and is transported by the drive force application means 4 from a plate-shaped work piece transporting unit 1 positioned upstream to one positioned downstream. It should be noted that the glass substrate is transferred onto a plate-shaped work piece transporting unit 1 positioned on the upstream side, and is transferred from a plate-shaped work piece transporting unit 1 positioned downstream to another position by a transferring machine that is not shown.

Figure 2:
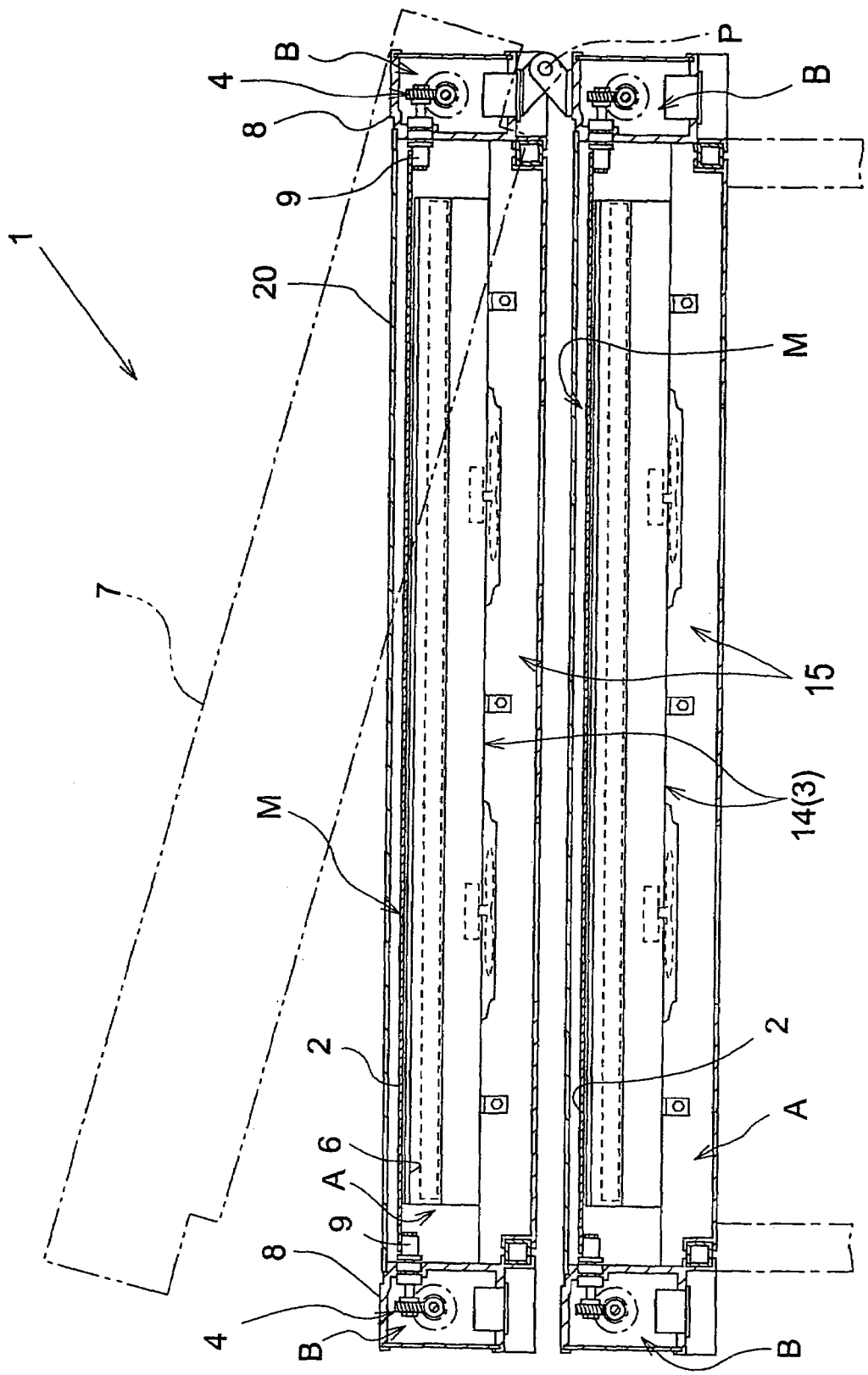
FIG. 2 is a front sectional view of the plate-shaped work piece transporting apparatus.
Figure 3:
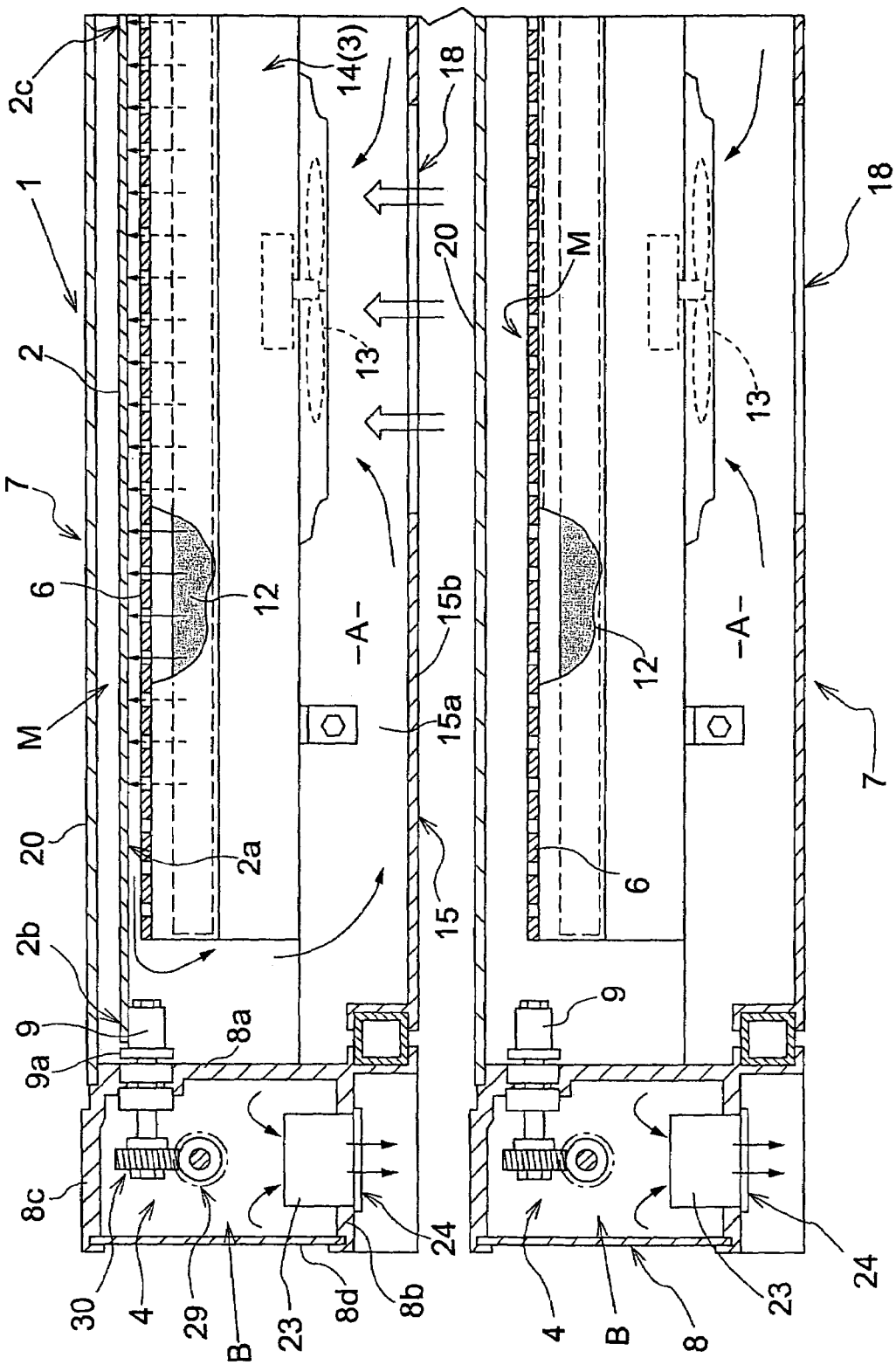
FIG. 3 is a partially magnified view of the front sectional view of the plate-shaped work piece transporting apparatus.

As shown in FIGS. 2 and 3, each plate-shaped work piece transporting unit 1 is provided with a air-supplying-type support means 3 for supplying purified air toward a lower surface 2a of the glass substrate 2, which is transported in a horizontal or substantially horizontal state, so as to contactlessly support the glass substrate 2, drive force application means 4 for applying a drive force in the transporting direction to the glass substrate 2, and a case member 7 covering a carry space A and an accommodation space B, which are discussed later, in a substantially airtight manner.

Figure 4:
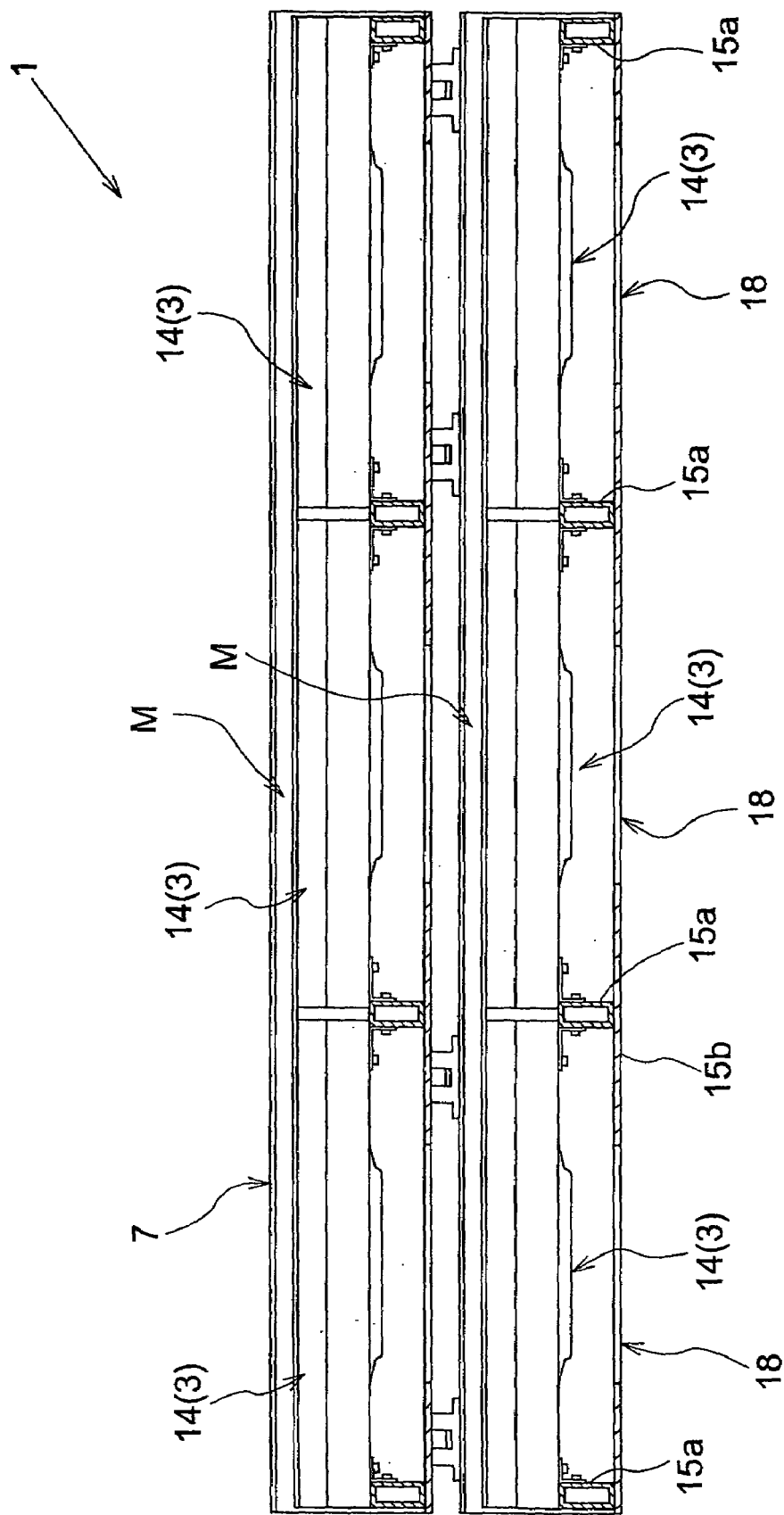
FIG. 4 is a lateral sectional view of the plate-shaped work piece transporting apparatus.

As shown in FIGS. 3 and 4, the air-supplying-type support means 3 is made of a plurality of fan-filter units 14 arranged in a line in the transporting direction. Each fan-filter unit 14 is provided with a dust-removal filter 12 made of a ULPA filter for removing dust, blower fans 13 serving as air-supplying means for supplying purified air to the lower surface 2a of the glass substrate 2 through the dust-filter 12, and an electric fan motor. Also, a rotation speed sensor RS serving as detection means for detecting the rotational speed of the blower fans 13 is provided near the blower fans 13.

That is, the fan-filter units 14 are provided as integral units in which two blower fans 13 lined up in the width direction, which is perpendicular to the transporting direction, of the glass substrate 2 and a single dust-removal filter 12 covering an upper side of the two blower fans 13 are supported by a housing. The air-supplying-type support means 3 is constituted by three fan-filter units 14 lined up in the transporting direction. A screening member 6 that allows the passage of purified air that has passed through the dust-removal filter 12 and that functions as a shield to prevent foreign bodies from dropping toward the dust removal filter 12 is disposed in the air-supplying-type support means supported on the housing such that it covers the area above the three fan-filter units 14. Furthermore, a chamber C in which purified air is accumulated is formed between this screening member 6 and the dust-removal filter 12. The height of the chamber C, that is, the distance between the screening member 6 and the dust-removal filter 12, is preferably sufficient to reduce any pulsation and is preferably 1 cm or greater. As a combination of the fan-filter unit 14 and the screening member 6, such a combination that is attached to the rear wall of a storage section used in a clean room can be employed.

Figure 5:
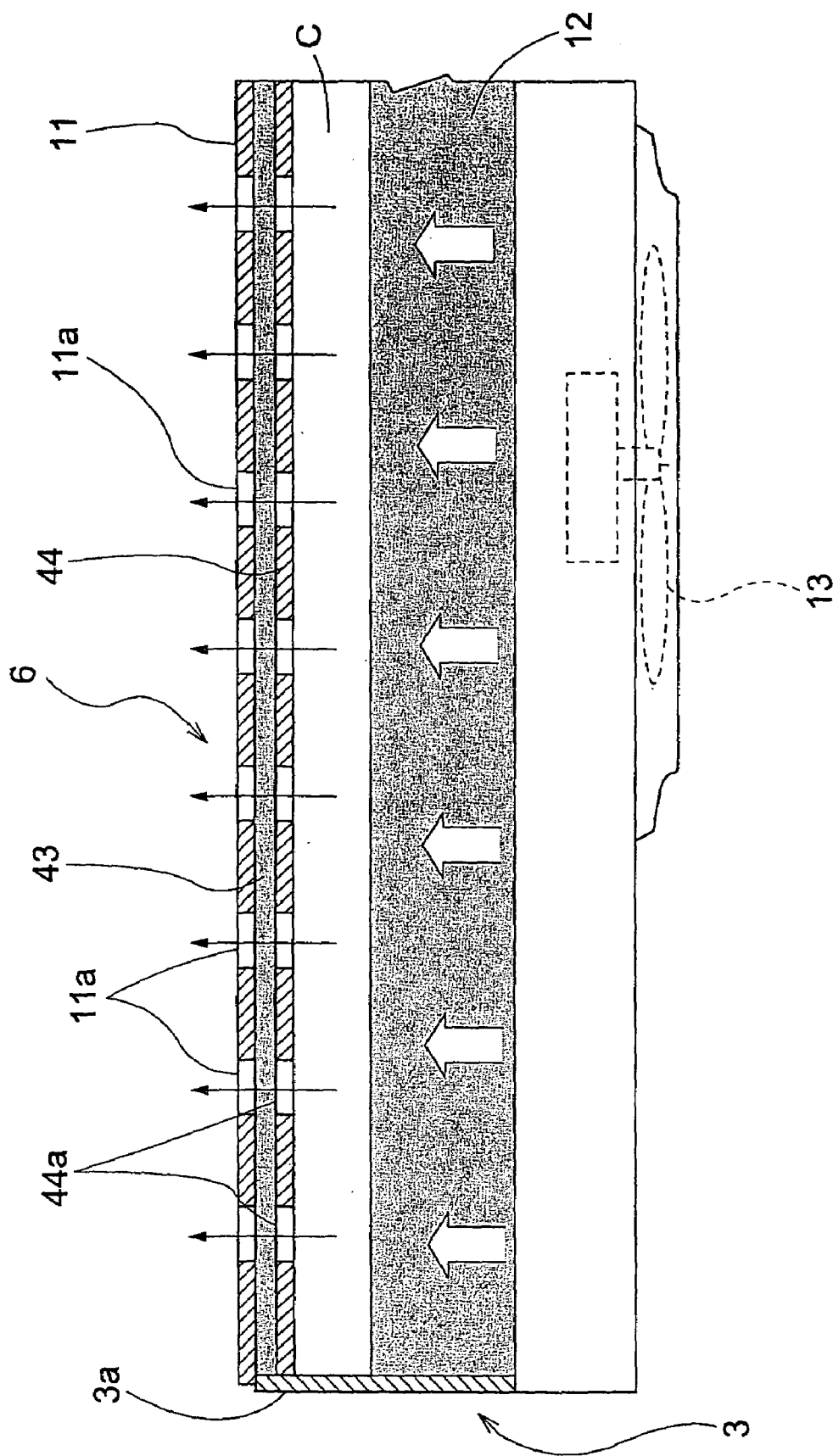
FIG. 5 is a partially magnified sectional view of a screening member.

The screening member 6 is described in detail below. As shown in FIG. 5, the screening member 6 is provided with a plate-shaped porous member 11 that rectifies the flow of purified air that has passed through the dust-removal filter 12, a sub-filter 43 positioned on the dust-removal filter 12 side of the porous member 11, and a porous support member 44 that is positioned on the dust-removal filter 12 side of the sub-filter 43 and supports the sub-filter 43. Ventilation holes 11a are formed over the entire porous member 11 by a punching press, and through holes 44a are formed also in the porous support member by punching press.

That is, as shown in FIG. 5, a lateral wall 3a of the housing of the air-supplying-type support means 3 extends above an upper face of the dust-removal filter 12. The porous member 11 is attached to an upper end of the lateral wall 3a, and the porous support member 44 is attached to the lateral wall 3a on the dust-removal filter 12 side of the position where the porous member 11 is attached, leaving a gap between itself and the dust-removal filter 12. The sub-filter 43 is sandwiched between the porous member 11 and the porous support member 44.

Then, by attaching the porous support member 44 to a position removed from the dust-removal filter 12, a single chamber C surrounded by the lateral wall 3a of the air-supplying-type support means 3, the dust-removal filter 12, and the porous support member 44 is formed.

Due to the blowing action of the blower fan 13, the air-supplying-type support means 3 sucks in air from below the blower fan 3 and supplies that air upward, where the dust-removal filter 12 is positioned. The air that is supplied upward passes through the dust-removal filter 12 and the screening member 6, is supplied as purified air to an intermediate portion 2c (that is, the region between end portions 2b) of the lower surface 2a of the glass substrate 2, and that purified air supports the intermediate portion 2c of the glass substrate 2. That is, the air supplied upward by the blower fans 13 becomes purified air after dust is removed therefrom when it passes through the dust-removal filter 12. Even if a pulsation is generated in the purified air that has passed through the dust-removal filter 12, that pulsation is suppressed by the operation of the chamber C. Also, the purified air is uniformly provided over a wide range of the lower surface of the plate-shaped work piece due to the porous support member 44 and the porous member 11, and is supplied to the intermediate portion 2c of the lower surface 2a of the glass substrate 2.

As shown in FIGS. 2 and 3, the case member 7 is provided with a unit frame member 15 substantially rectangular in planar view that supports the fan-filter units 14, a pair of left and right accommodation frames 8 provided in the transporting direction at the end portions of the unit frame member 15, and a transporting cover 20 that extends from the upper end portion of the right accommodation frame 8 to the upper end portion of the left accommodation frame 8. Each accommodation frame 8 is provided with an accommodation cover 8d formed substantially bracket-shaped if viewed in the transporting direction and on the side opposite the carry space A side, provided with an upper wall 8c, a lower wall 8b, and an inner circumferential wall 8a on the carry space A side. Further, the unit frame member 15 is made of a support frame portion 15a incorporating a frame member, and a plate-shaped frame member 15b positioned below the support frame portion and provided with an air introduction opening 18 for introducing outside air into the carry space A.

The carry space A and the accommodation space B are in communication through the plate-shaped work piece transporting unit 1 provided on the upstream side and the plate-shaped work piece transporting unit 1 provided on the downstream side, which are lined up in the transporting direction. The plate-shape work piece transporting unit 1 positioned on the most upstream side of the plate-shaped work piece transporting apparatus H is blocked by a screening member, not illustrated, on the upstream end portion of the carry space A and the accommodation space B. The plate-shaped work piece transporting unit 1 positioned on the most downstream side is blocked by a screening member on the downstream end portion of the carry space A and the accommodation space B. Consequently, the carry space A is formed substantially airtight by the unit frame member 15, the inner circumferential wall 8a of the accommodation frame 8, the transporting cover 20, and the screening members. The accommodation space B is formed substantially airtight by the accommodation frame 8 and the screening members.

The upper area of the carry space A can be opened by removing the transporting cover 20, and lateral surfaces of the accommodation space B can be opened by removing the accommodation cover 8d. The air-supplying-type support means 3, the drive rollers 9 in the drive force application means 4, and the path over which the glass substrate 2 is transported are accommodated within the carry space A. As will be explained later, the electric motor 10 for driving the drive rollers 9 is accommodated within the accommodation space B. Also, an outside discharge opening 24 for discharging the air in the accommodation space B to the outside is provided in the lower wall 8b of the accommodation frame 8, and a sub-fan-filter unit 23 serving as an outside discharge means having a blowing function and a dust-removal function is provided such that it blocks the outside discharge opening 24.

Consequently, in the carry space A, air within the carry space A is sucked in by the fan-filter unit 14 and this air that has been sucked in is supplied toward the lower surface 2a of the glass substrate 2 as purified air after passing through the dust-removal filter 12 and the screening member 6, circulating the air within the carry space A. Also, due to the fan-filter unit 14, outside air is introduced into the carry space A from the air introduction opening 18, increasing the pressure within the carry space A, and thus some of the air circulating within the carry space A is discharged to the outside from for example the gap between the accommodation frame 8 and the transporting cover 20, exchanging some of the air circulating within the carry space A. Also, in the accommodation space B, due to the sub-fan-filter unit 23, the air in the accommodation space B is discharged to the outside from the outside discharge opening 24, reducing the pressure within the accommodation space B, and thus outside air is introduced into the accommodation space B from for example the gap between the upper wall 8c and the accommodation cover 8d, exchanging some of the air in the accommodation space B. Thus, because the carry space A is pressurized, outside air can be kept from infiltrating into the carry space A from for example the gap between the accommodation frame 8 and the carry cover 20, and since pressure within the accommodation space B has been reduced, it is possible to keep air within the accommodation space B from escaping out through for example the gap between the upper wall 8c and the accommodation cover 8d.

Figure 6:
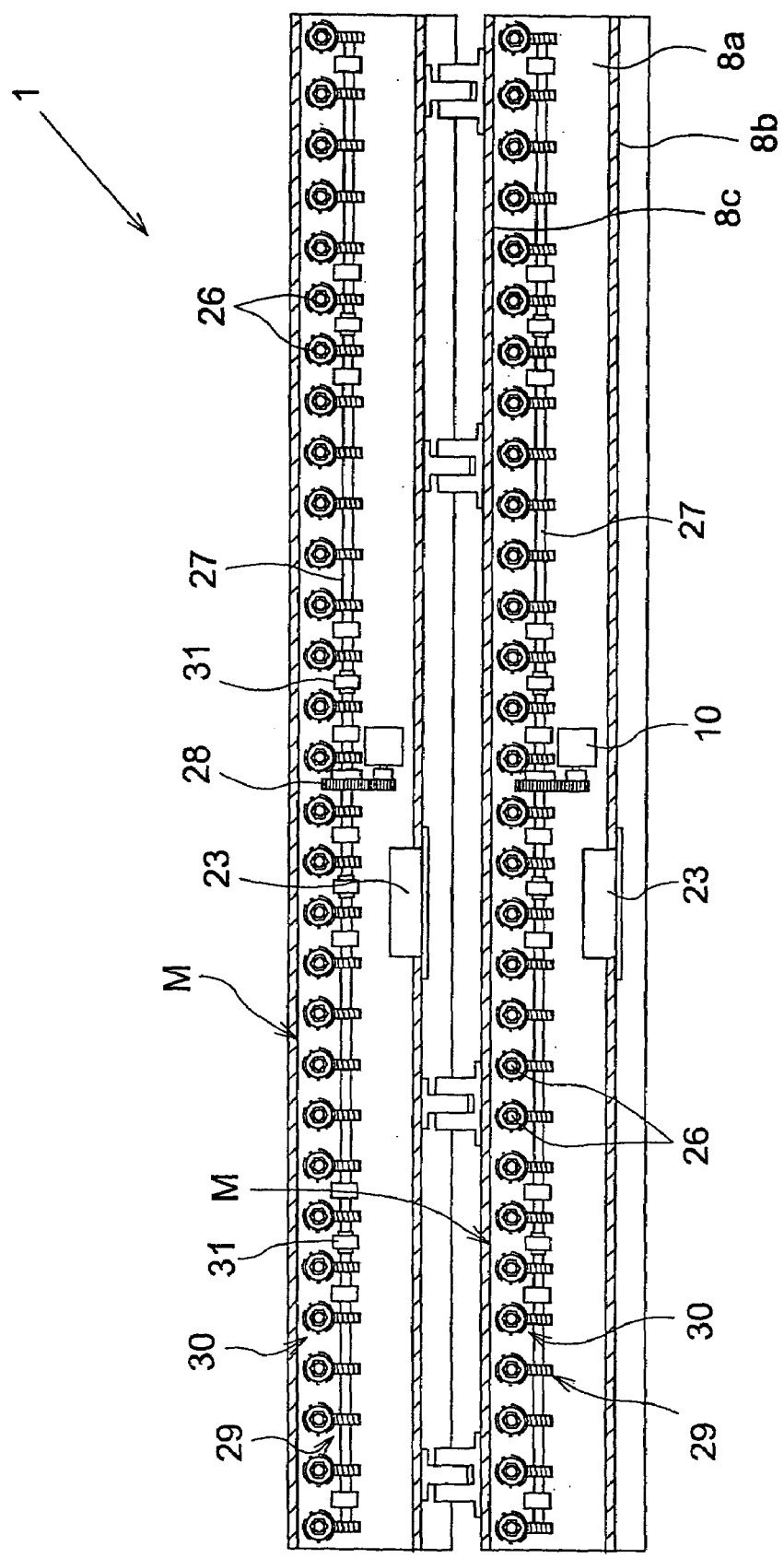
FIG. 6 is a lateral view of a drive force application means.
Figure 7:
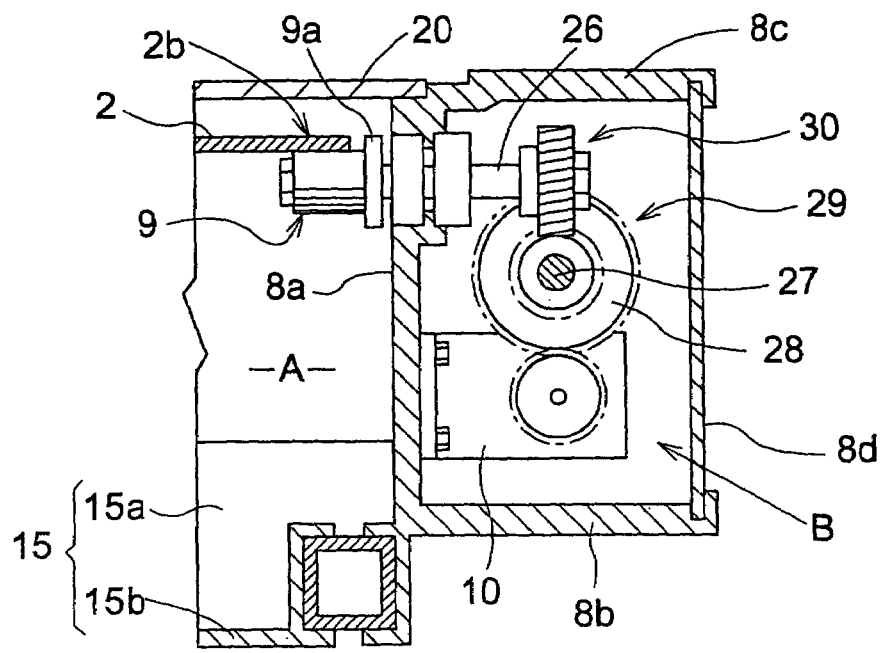
FIG. 7 is a front view of the drive force application means.
Figure 8:
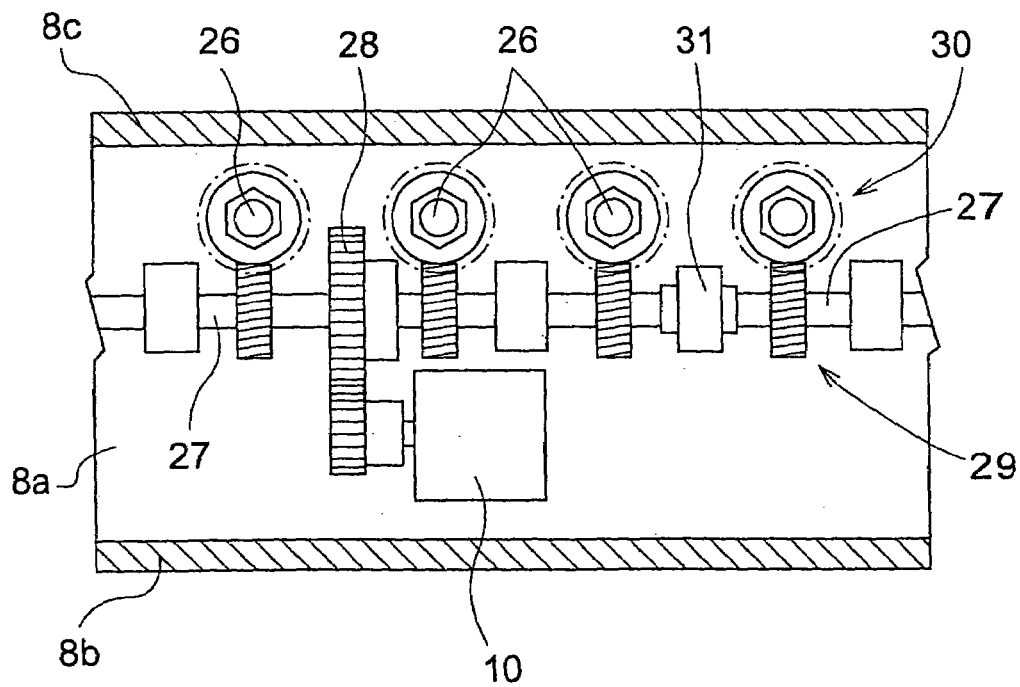
FIG. 8 is a partially magnified lateral view of the drive force application means.

The drive force application means 4 is explained in further detail below. As shown in FIGS. 6 to 8, a plurality of power transmission shafts 27 lined up in the transporting direction and operatively linked to one another by couplings 31, and the electric motor 10 whose output gears mesh with a spur gear 28 provided on one of the power transmission shafts 27, are provided in the accommodation spaces B of the pair of case members 8. Furthermore, numerous output shafts 26 protruding toward the accommodation space B and the carry space A are rotatively supported in the transporting direction on the inner walls 8a of the pair of accommodation frames 8. Drive rollers 9 provided with a large diameter portion 9a are provided on the portion of the output shaft 26 that protrudes into the carry space A. Input gear portions 30 that mesh with output gear portions 29, which are made of a screw gear and provided on the power transmission shafts, are provided on the portion of the output shafts 26 that protrudes into the accommodation space B.

Consequently, as shown in FIG. 3, both end portions 2b of the glass substrate 2 are supported in a contacting manner by the drive rollers 9 of the drive force application means 3 and its intermediate portion 2c is contactlessly supported by the purified air of the air-supplying-type support means 4, and it is transported in the transporting direction by the drive force that is applied by the driving rollers 9, which are rotatively driven by the electric motor 10. Misalignment of the glass substrate 2 in the direction intersecting the transporting direction is restricted by the large diameter portion 9a of the drive rollers 9.

As shown in FIG. 2, the plate-shaped work piece transporting apparatus H is provided with two upper and lower step transporting portions M for transporting the class substrate 2, and the upper transporting portion M of those upper and lower transporting portions M is configured such that it can be swingably operated upward about one end side in order to open the area above the lower transporting portion M. That is, a transporting case 5 is provided with an upper and a lower part in each plate-shaped work piece transporting unit 1, and the transporting portions M made of the air-supplying-type support means 3 or the drive force application means 4, for example, is accommodated in each transporting cases 5. By swinging the upper transporting case 5 upwards about the axis P, the upper transporting case 5 and the upper transporting portion M together are swung upwards, opening the upper area of the lower transporting case, and this allow maintenance within the transporting space A to be performed from above by removing the cover 20 of the lower transporting case 5. It should be noted that as regards the manner in which the upper and lower level transporting portions M are employed, it is also possible to adopt a configuration in which the upper transporting portion M and the lower transporting portion M are transported in opposite directions, such that the upper transporting portion M carries the glass substrate 2 from a carry source to a carry destination, and the glass substrate 2 for which the same process is performed or defective glass substrates 2, for example, are transported from the carry destination to the carry source by the lower transporting portion M. Furthermore, it is also possible to adopt a configuration in which the upper transporting portion M and the lower transporting portion M have identical transporting directions, and plate-shaped work pieces are transported from the carry source to the carry destination by the upper transporting portion M and the lower transporting portion M. There are also plate-shaped transporting units 1 provided with a single level transporting portion M that can be raised and lowered in place of the two upper and lower transporting portions M, and this is used when transporting the glass substrate 2 between the upper transporting portion M and the lower transporting portion M, such as when sending a glass substrate 2 that has been received from the upper transporting portion M of the plate-shaped work piece transporting unit 1 to the adjacent lower transporting portion M of the plate-shaped work piece transporting unit 1.

The control means E is described next.

Figure 9:
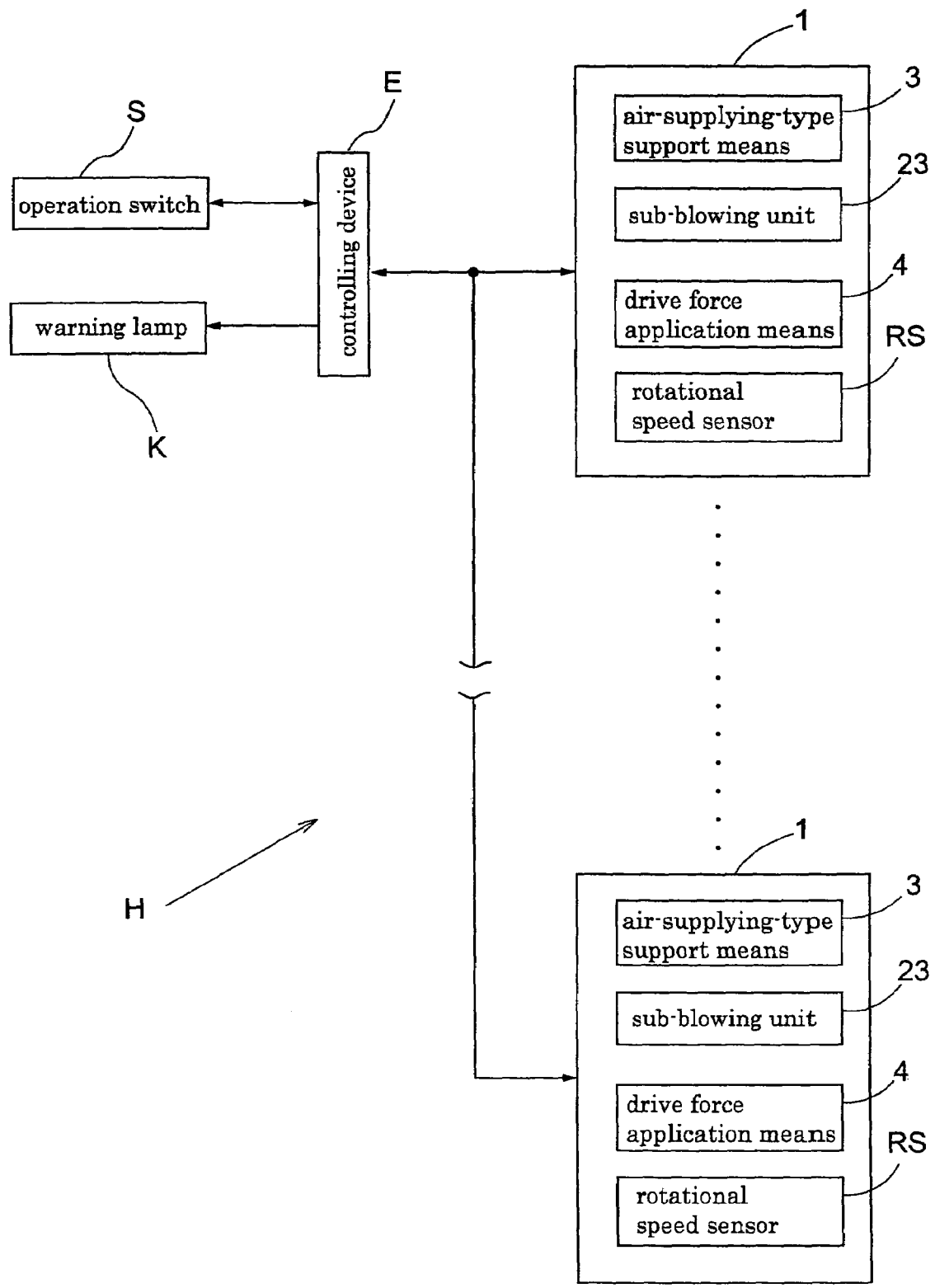
FIG. 9 is a control block diagram for the transporting apparatus.

A controlling device E controls the operations of starting, stopping, and stopping transporting of the plate-shaped work piece transporting apparatus H, based on commands from an operation switch S as shown in FIG. 9. That is, when the controlling device E receives an order to start operation from the operation switch S, it operates the air-supplying-type support means 3, the sub-fan-filter units 23, and the drive force application means 4 of each plate-shaped work piece transporting unit 1 to start operation of the plate-shaped work piece transporting apparatus H. When a command to stop operation is received from the operation switch S, the controlling device E stops operating the air-supplying-type support means 3, the sub-fan-filter unit 23, and the drive force application means 4 in each plate-shaped work piece transporting unit 1 so as to stop operation of the transporting system H. Then, when a stop transporting command is received from the operation switch S, the controlling device E stops operating the drive force application means 4 while continuing to operate the air-supplying-type support means 3 in each plate-shaped work piece transporting unit 1, stopping transporting of the glass substrate 2 by the transporting system H.

Second Embodiment

In the embodiment described above, the plate-shaped work piece transporting apparatus transported the plate-shaped work piece in a horizontal or substantially horizontal orientation, but it is also possible to carry the plate-shaped work piece in an orientation that is close to vertical. Also, the rotating drive members are made of the plurality of drive rollers, and the driven rotors are made of a plurality of driven rollers, but it is also possible for the drive rotors and the driven rotors to be made of an endless belt-shaped member such as a timing belt. Such plate-shaped work piece transporting apparatus is described next. It should be noted that structural components identical to those of the embodiment described above are assigned identical reference numerals and description thereof is omitted.

Figure 10:
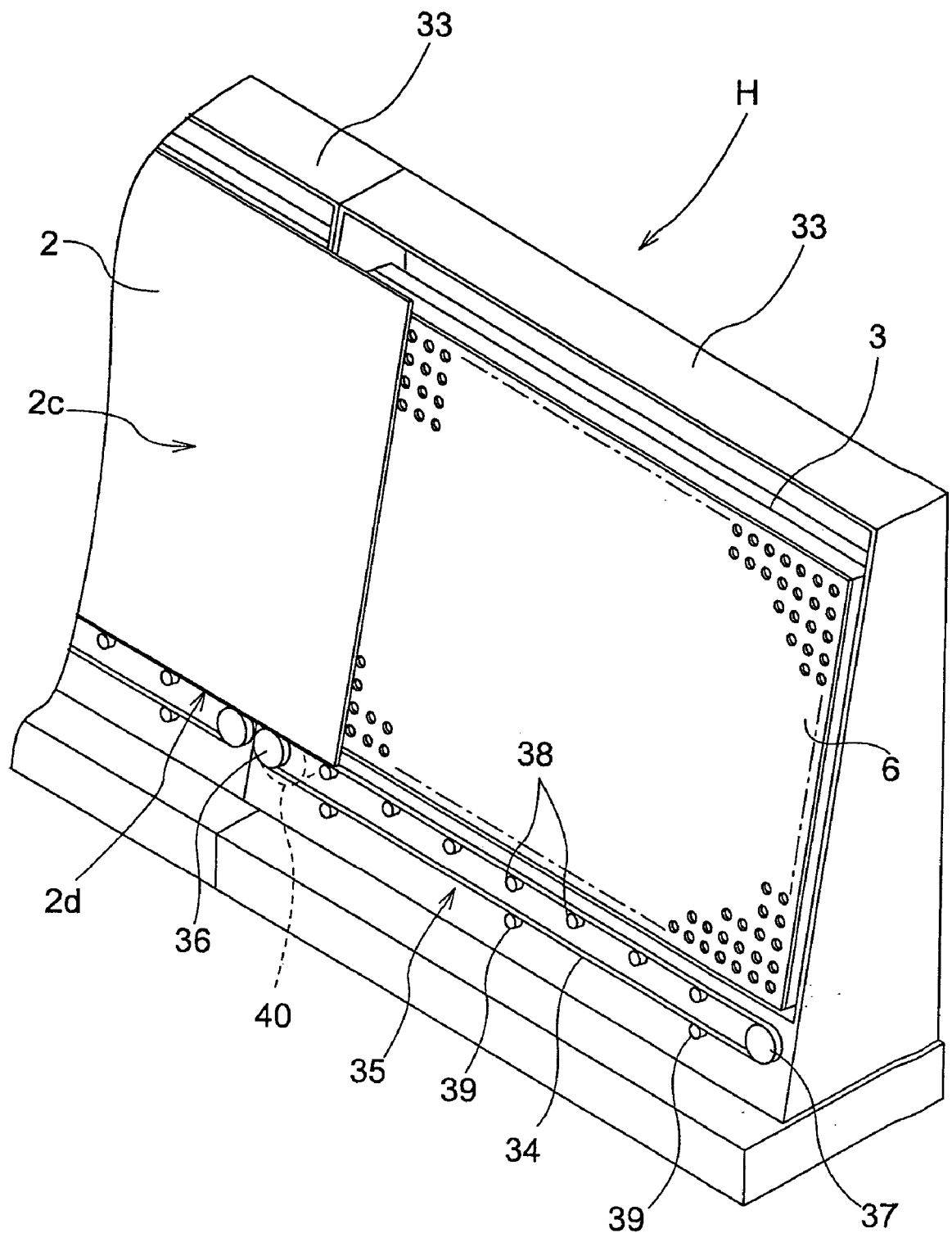
FIG. 10 is a perspective view of a plate-shaped work piece transporting apparatus according to a separate embodiment.
Figure 11:
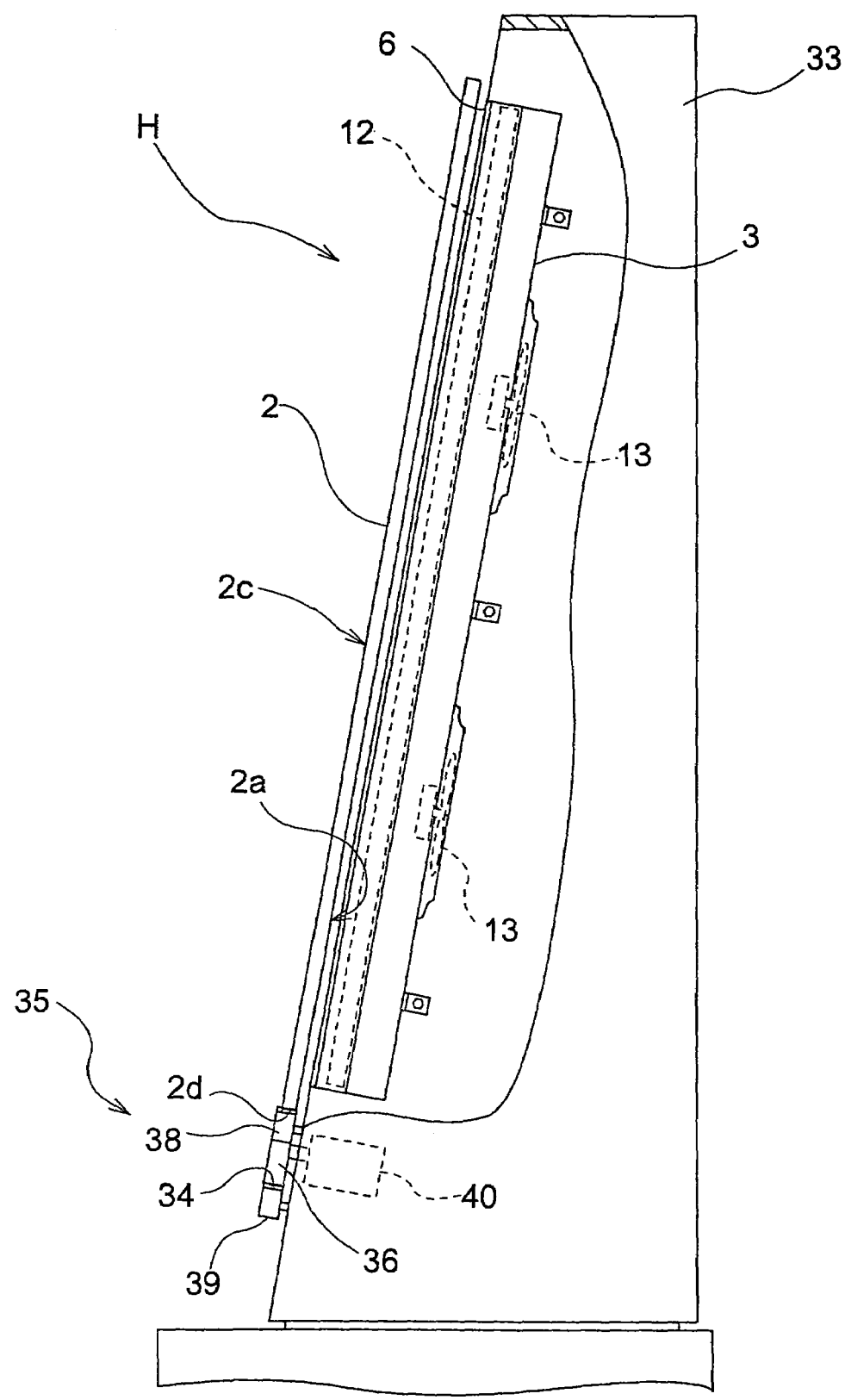
FIG. 11 is a lateral view of a plate-shaped work piece transporting apparatus according to a separate embodiment.

The plate-shaped work piece transporting apparatus H shown in FIGS. 10 and 11 uses plate-shaped vertical transporting units 33 lined up in the transporting direction of the glass substrate 2. Each plate-shaped work piece vertical transporting unit 33 is provided with a air-supplying-type support 3 means provided in a near vertical orientation to contactlessly support the glass substrate 2 by supplying purified air toward the lower surface 2a of the glass substrate 2, which is transported in an orientation that is close to a vertical orientation, and a timing belt 34 that functions as a drive rotor for applying a-drive force while supporting one edge of the two edge portions 2b of the glass substrate 2 in a contacting manner. The plate-shaped work piece transporting apparatus H is also provided with a vertical orientation drive force application means 35 for applying a drive force to the glass substrate 2 in the transporting direction.

As shown in FIG. 10, the vertical orientation drive force application means 35 is constituted by a drive wheel 36 positioned downstream that is rotated by an electric motor 40, a driven wheel 37 positioned upstream that rotates freely, the timing belt 34, which is wound between the drive wheel 36 and the driven wheel 37, inner support wheels 38 for supporting the feed path portion of the timing belt 34 from the inner circumferential side, and outer support wheels 39 for supporting the return path portion of the timing belt 34 from the inner circumferential side.

Consequently, the glass substrate 2 is supported in a contacting manner on a single edge portion 2d by the external circumferential side of the timing belt 35 in the vertical orientation drive force application means 35, its intermediate portion 2c is contactlessly supported by purified air from the air-supplying-type support means 4, and it is transported in the transporting direction by the drive force that is applied by the timing belt 35, which is rotatively driven.

As in the first embodiment, in the second embodiment it is also possible to provide a case that covers the carry space accommodating the air-supplying-type support means 3 and the path over which the glass substrate 2 is transported in a substantially airtight manner.

Third Embodiment

A separate embodiment of the present invention is described next. In this description, sections identical to those of preceding embodiments are assigned identical reference numerals and description thereof is not repeated.

Figure 17:
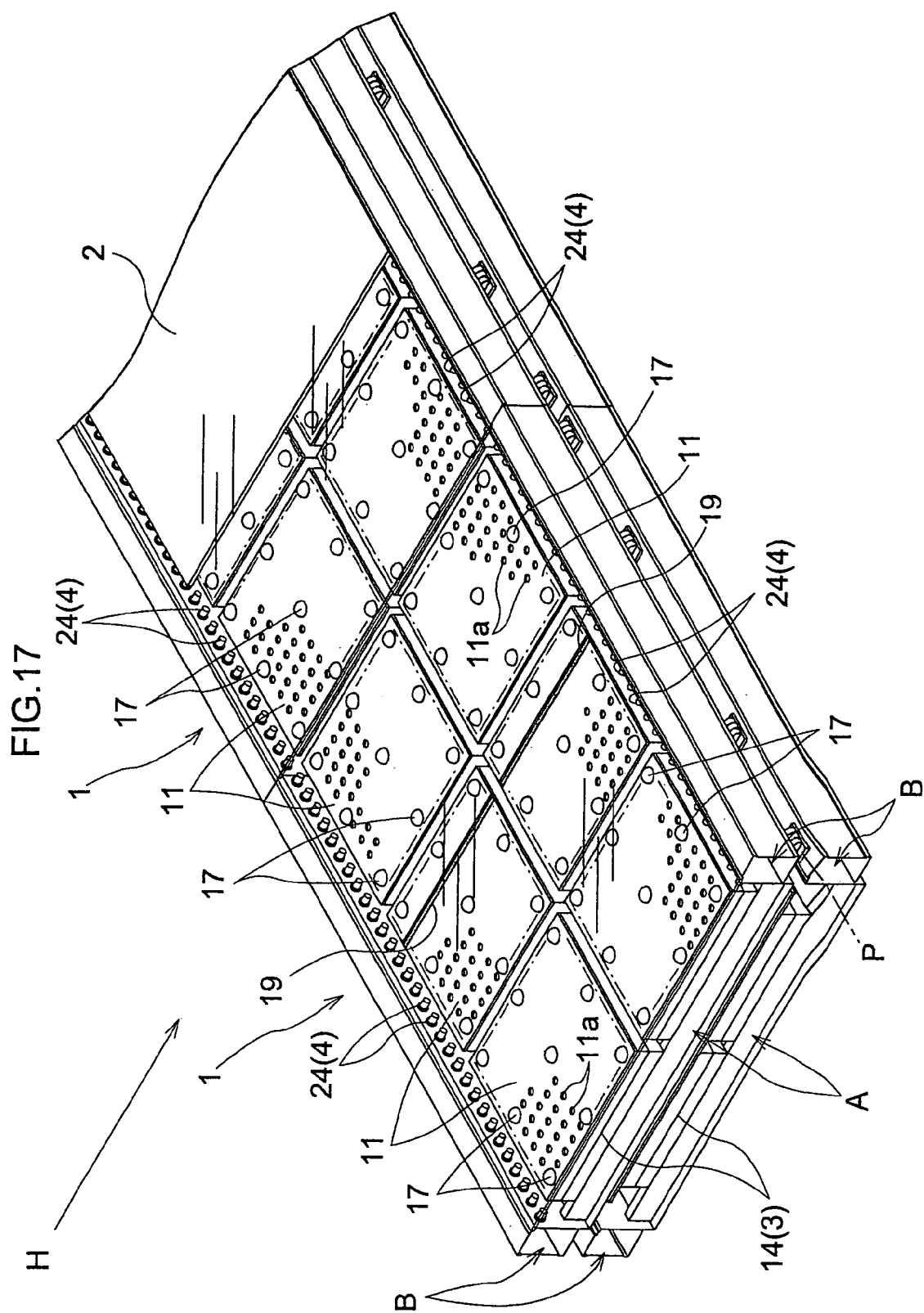
FIG. 17 is a perspective view of the transporting apparatus.
Figure 18:
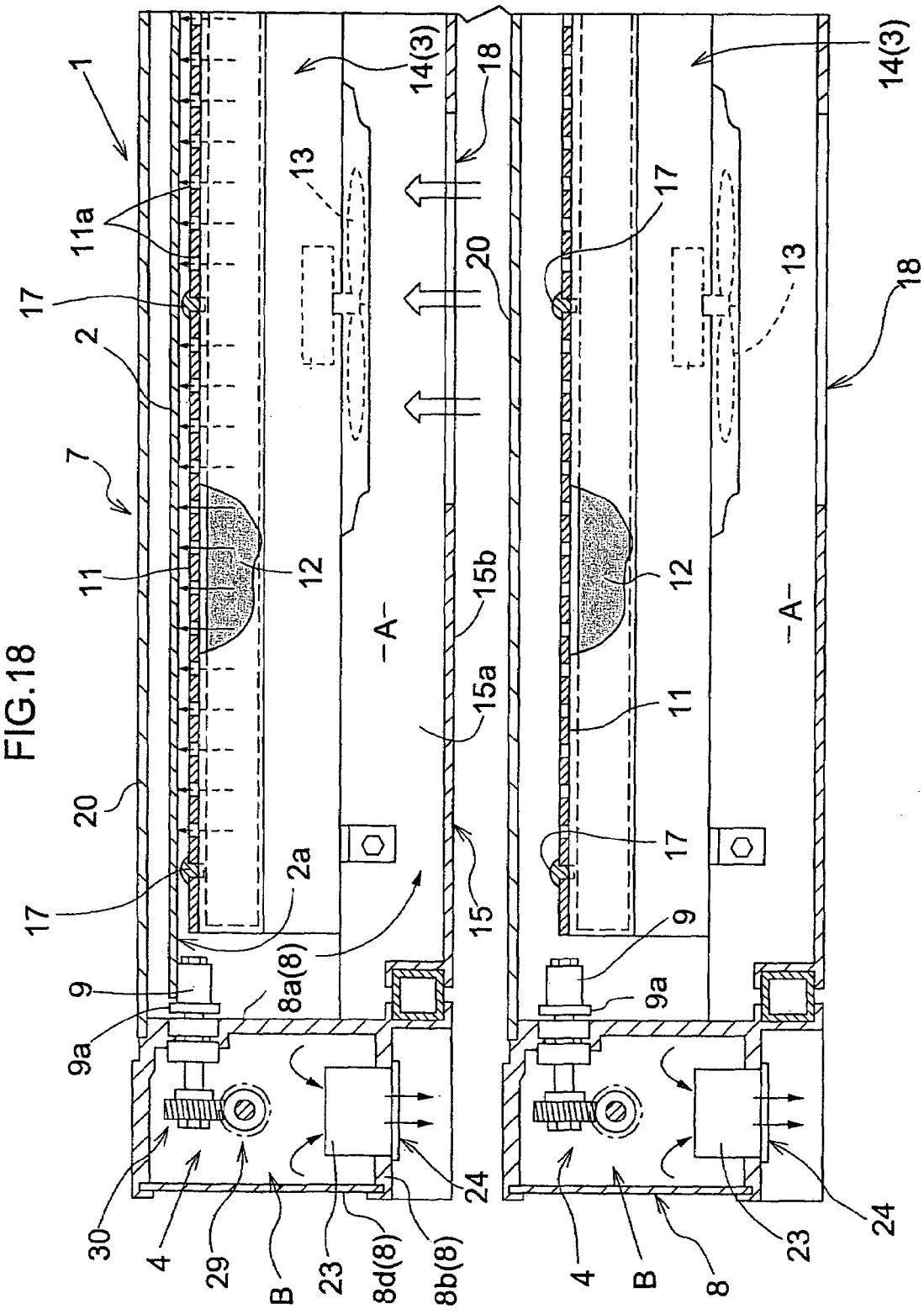
FIG. 18 is a partially magnified front view of a transporting unit.
Figure 19:
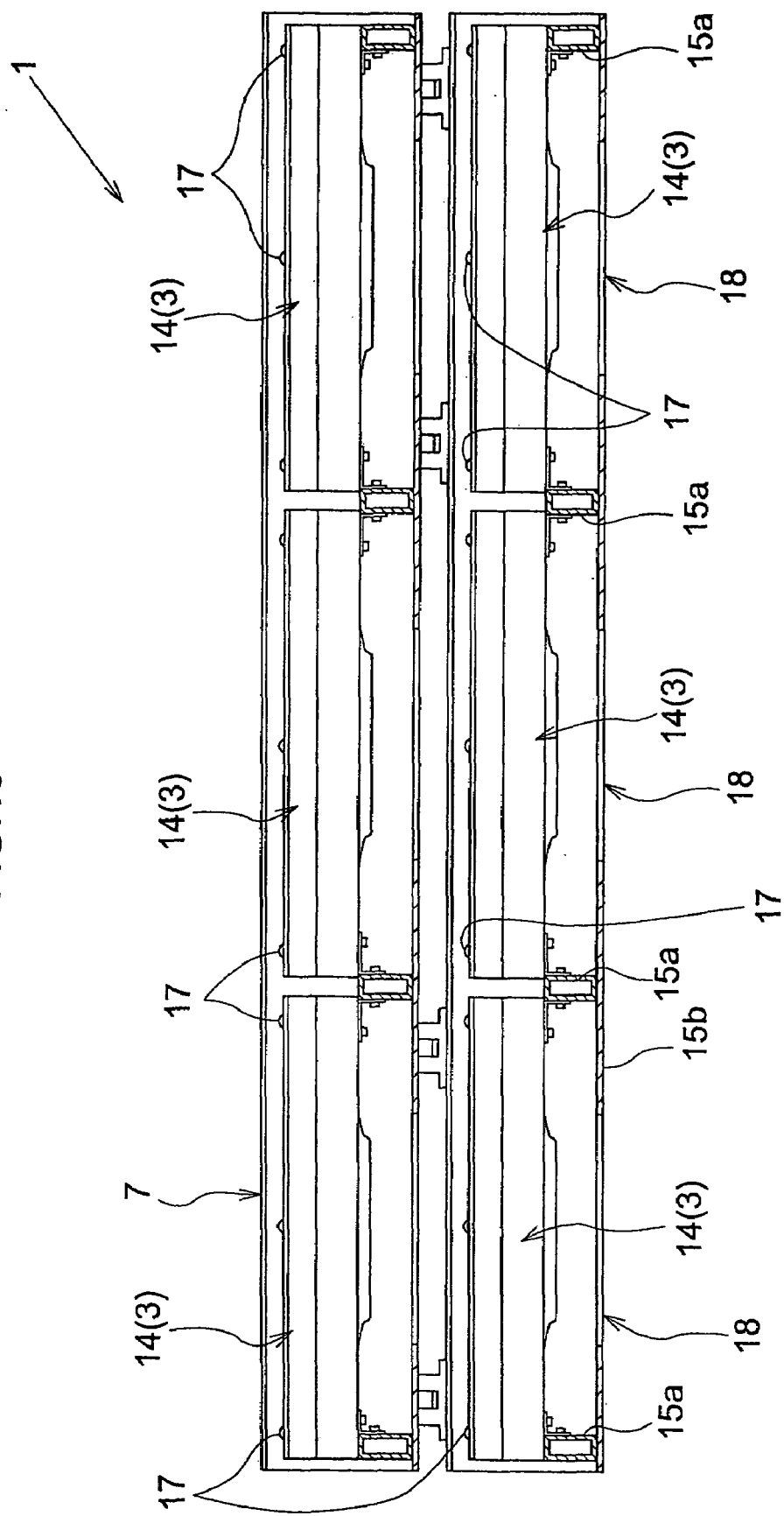
FIG. 19 is a lateral view of the transporting unit.
Figure 20:
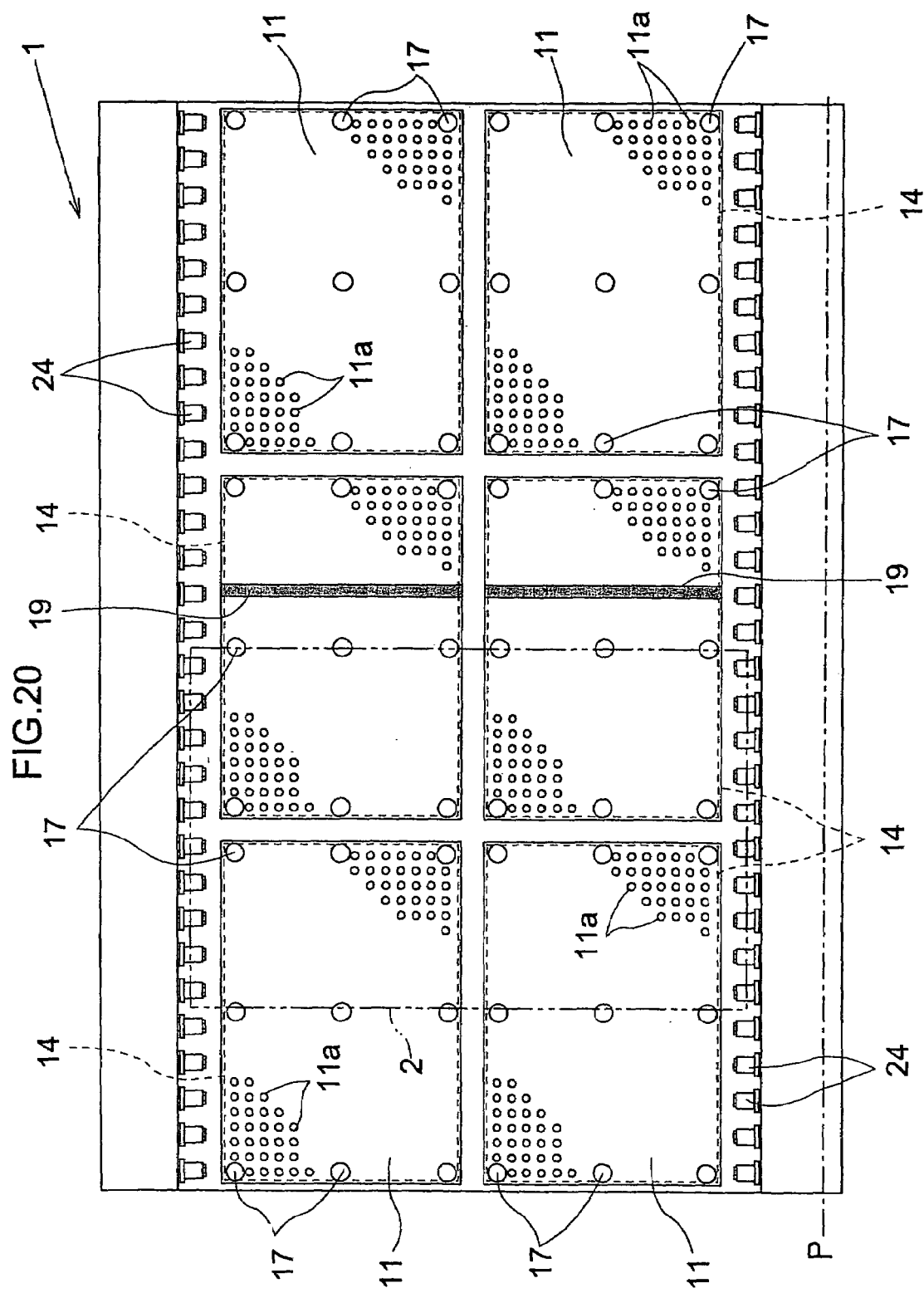
FIG. 20 is a plan view of the transporting unit.

As illustrated in FIGS. 17 and 20, the plate-shaped work piece transporting apparatus H is provided with a contact-type support means for supporting the glass substrate 2 that has been lowered to below a set height supported by the air-supplying-type support means 3 on the upper surface of the air-supplying-type support means 2, that is, above the upper surface of the porous member 11. The contact-type support means is made of a plurality of support members 17 arranged dispersed in the transporting direction and the width direction. More specifically, in each porous member 11 the plurality of support members 17 are made of a resin material and arranged dispersed in the transporting direction and the width direction on the porous member 11, the support members 17 are supported by the porous members 11 by fitting their base portion 17b into ventilations holes 11a as shown in FIG. 21, and hemispherical tip portions 17a of the support members 17 protrude from the upper surface of the porous members 11.

Figure 22A:
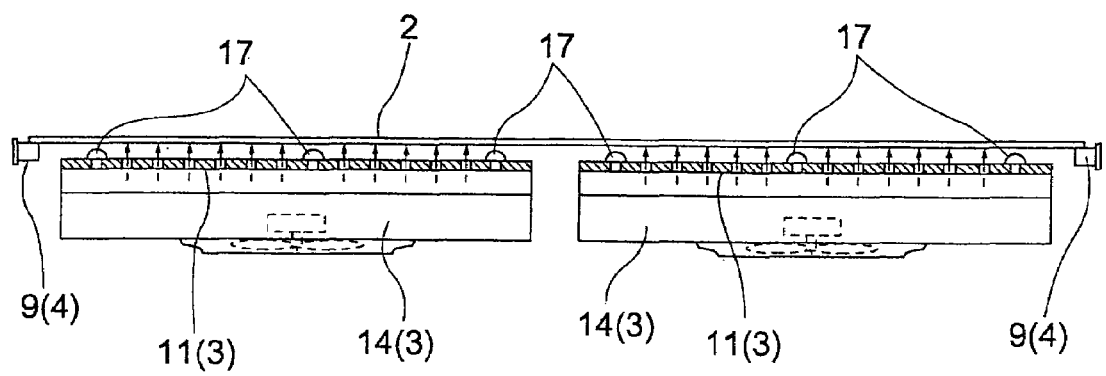
FIG. 22A shows the glass substrate supported at a predicted height.
Figure 22B:
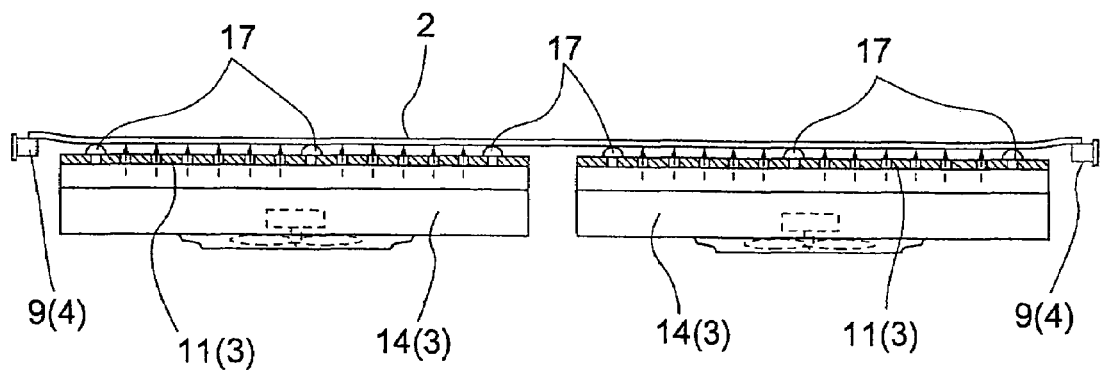
FIG. 22B shows the glass substrate lowered to below the predicted height.

Consequently, even if the glass substrate 2 is lowered from a set height at which it is supported by the air-supplying-type support means 3 as shown in FIG. 22A, it is possible to support the lowered glass substrate 2 above the upper surface of the air-supplying-type support means 3 using the plurality of support members 17 as shown in FIG. 22B.

Figure 21:
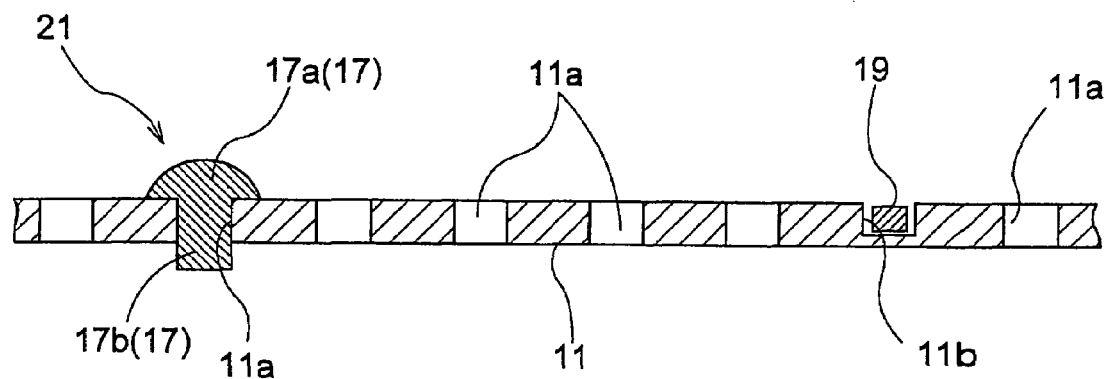
FIG. 21 is a lateral view of a porous member showing a support member and the supported state of an ionizer.

Furthermore, as shown in FIGS. 20 and 21, a groove 11b positioned in the middle of the fan-filter units 14 lined up in the transporting direction is formed in the width direction in each porous member 11, and an ionizer 19 for removing static charge from the glass substrate 2 is provided in this groove 11b.

Furthermore, the controlling device E is configured such that when an order to start operation arrives from the operation switch S, the operation of the drive force application means 4 is stopped when the rotational speed of the blower fans 13 is lower than a set speed based on detection information from the rotation speed sensor RS.

That is to say, the set speed is set to a speed below which purified air cannot be adequately supplied to the lower surface of the glass substrate 2 even if the blower fans 13 are rotating, weakening the force supporting the glass substrate 2 such that there is a possibility that the glass substrate 2 will be supported by the contact-type support means 17, and by stopping operation of the drive force application means when the rotational speed of the blower fans 13 is below the above set speed, the glass substrate 2 is supported by the contact-type support means and is not transported.

In a state where there has been a command from the operation switch S to start operation or to stop transporting, when the rotational speed of the blower fans 13 drops below the set speed according to the detection information of the rotational speed sensor RS, a warning lamp K (see FIG. 9) flashes to alert nearby workers that the transporting of the glass substrate 2 has stopped because of a drop in the rotational speed of the blower fans 13.

Figure 12:
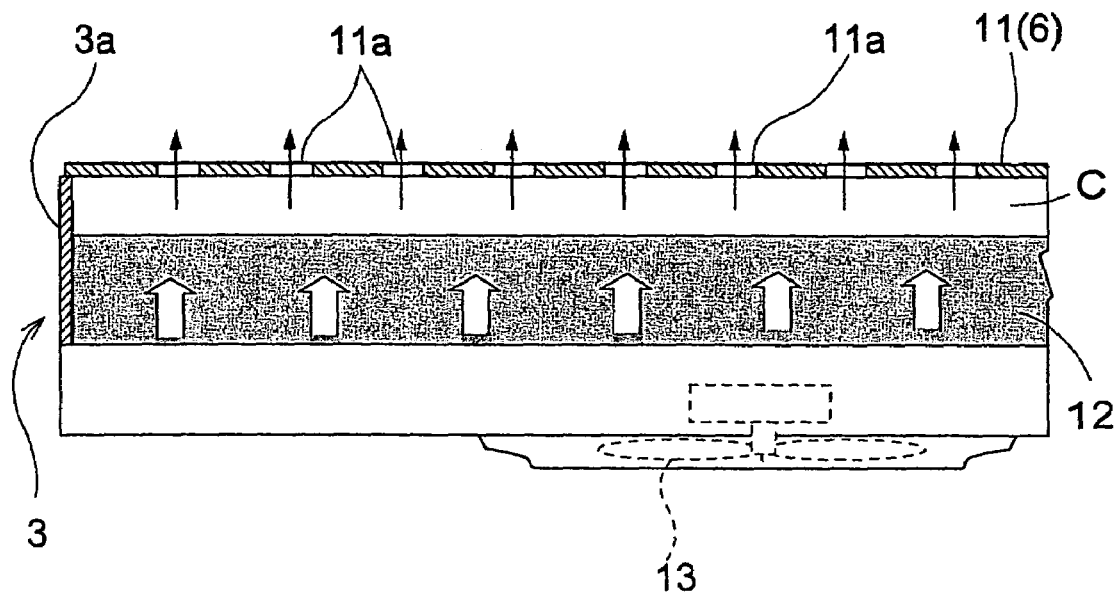
FIG. 12 is a partially magnified sectional view of a screening member according to a separate embodiment.

FURTHER EMBODIMENTS (1) In the first embodiment described above, the screening member was made of a porous member, a sub-filter, and a porous support member, but it is also possible for the screening member to be made of only the porous member and the sub-filter and for the sub-filter to be supported by adhering it to the porous member using adhesive or the like. As shown in FIG. 12, it is also possible to adopt a configuration in which the screening member 6 is made of the porous member 11 only, such that the fall of only relatively large foreign bodies is prevented.

(2) In the foregoing embodiment, the screening member is constituted by interposing the sub-filter into the entire space between the porous member and the porous support member, but it is also possible to adopt a configuration in which the screening member is achieved by partially interposing sub-filters between the porous member and the porous support member in correspondence with the ventilation holes and the through holes, and by partially interposing the sub-filters it is possible to reduce the quantity of sub-filter, thereby allowing the screening member to be manufactured more inexpensively. That is to say, it is also possible to configure the sub-filters as described below in [a], [b] and [c].

Figure 13A:
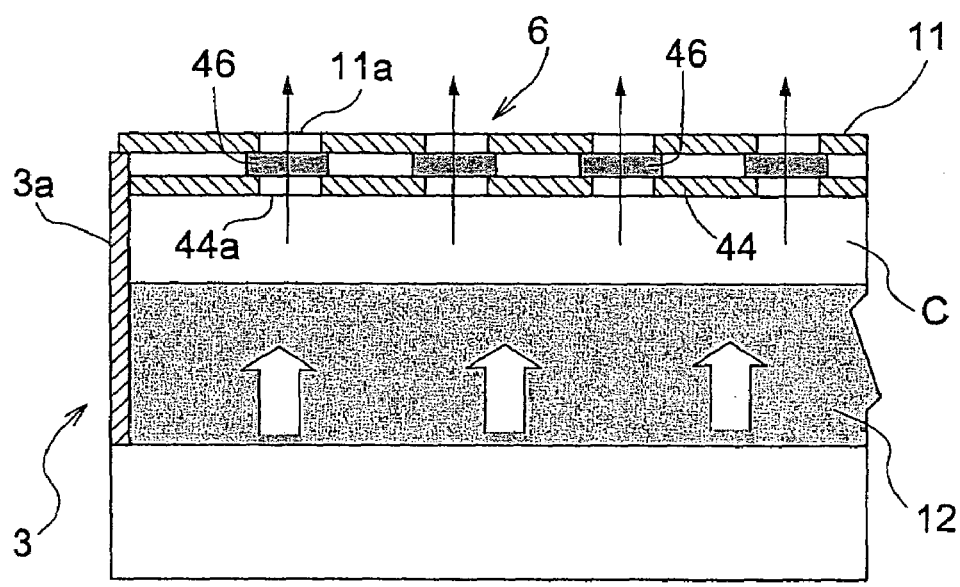
FIG. 13A is a partially magnified sectional view of the screening member according to a separate embodiment.
Figure 13B:
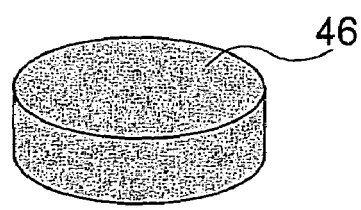
FIG. 13B is a perspective view showing a filter piece according to a separate embodiment.

[a] As shown in FIGS. 13A and 13B, it is possible to achieve the sub-filters using a plurality of filter pieces 46 provided so as to block one ventilation hole 11a of the porous member 11 and one through hole 44a of the porous support member 44.

Figure 14A:
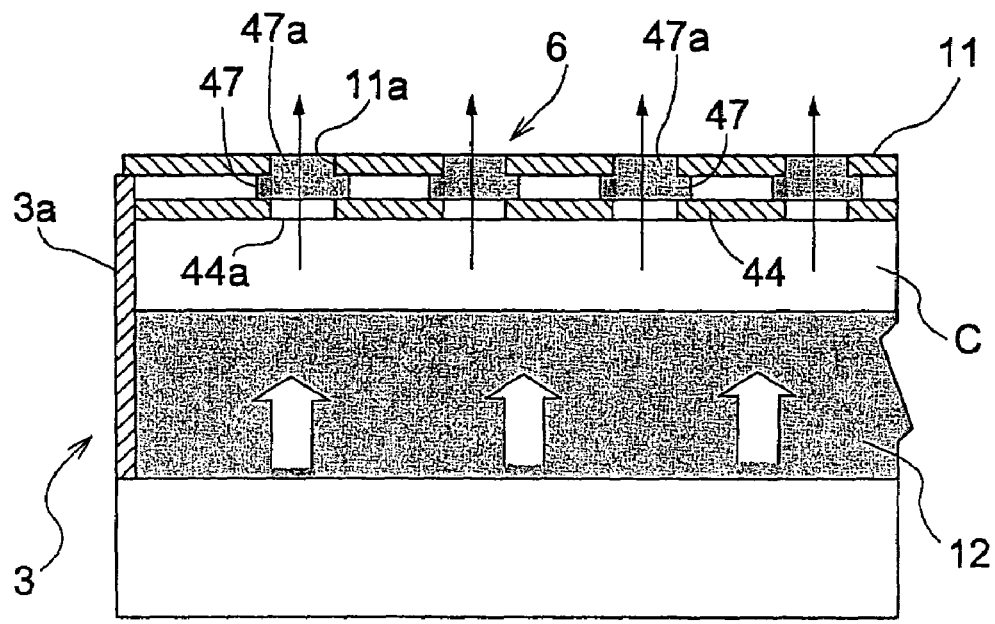
FIG. 14A is a partially magnified sectional view of the screening member of a separate embodiment.
Figure 14B:
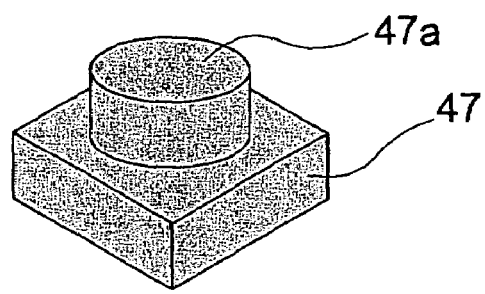
FIGS. 14B and 14C are perspective views of a filter piece with projection according to a separate embodiment.
Figure 14C:
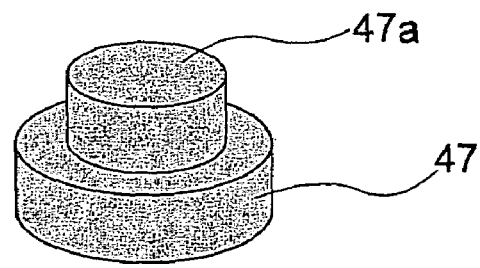

[b] As shown in FIGS. 14A, 14B, and 14C, it is also possible to achieve the sub-filters using a plurality of filter pieces with projections 47, provided so as to block one ventilation hole 11a of the porous member 11 and one through hole 44a of the porous support member 44, thereby allowing misalignment of the sub-filter 43 in the width direction to be restricted by fitting a protruding portion 47a formed on the filter pieces with projection 47 into the ventilation hole 11a of the porous member 11.

Figure 15A:
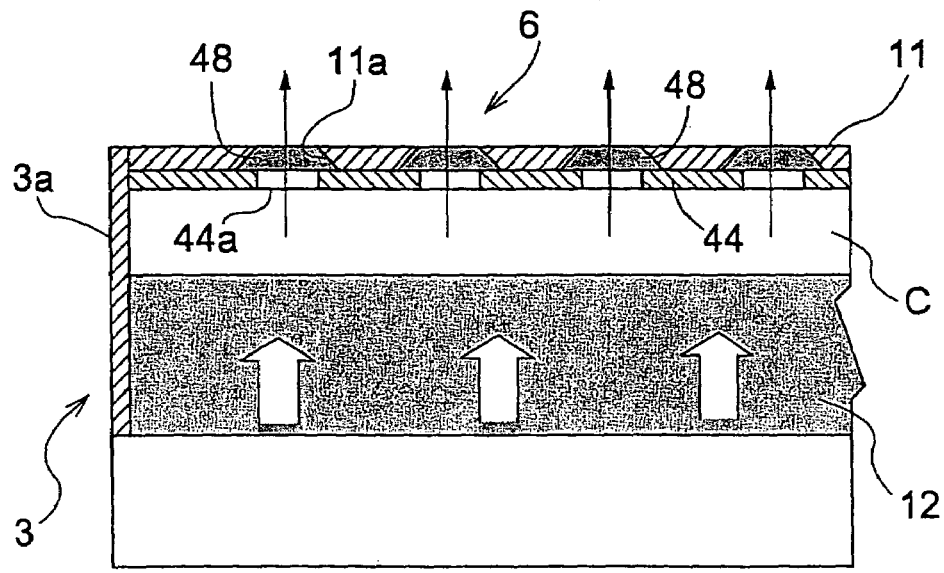
FIG. 15A is a partially magnified sectional view of the screening member according to a separate embodiment.
Figure 15B:
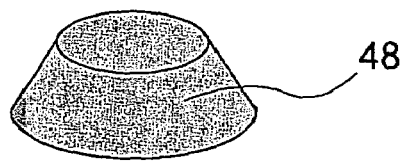
FIG. 15B is a perspective view showing an interfitting filter according to a separate embodiment.

[c] As shown in FIGS. 15A and 15B, it is also possible to make the screening member thin by forming the ventilation holes 11a of the porous member 11 in a shape where they widen toward the porous support member 44, achieving the sub-filters using a plurality of interfitting filter pieces 48 disposed in each ventilation hole 11a and providing the porous member 11 in close contact with the porous support member 11a.

Then, as in [b] and [c], by making the upper surface of the filter pieces with projection 47 or the interfitting filter pieces 48 coplanar with the upper surface of the porous member 11, dust can be kept from accumulating in the ventilation holes 11a.

Figure 16:
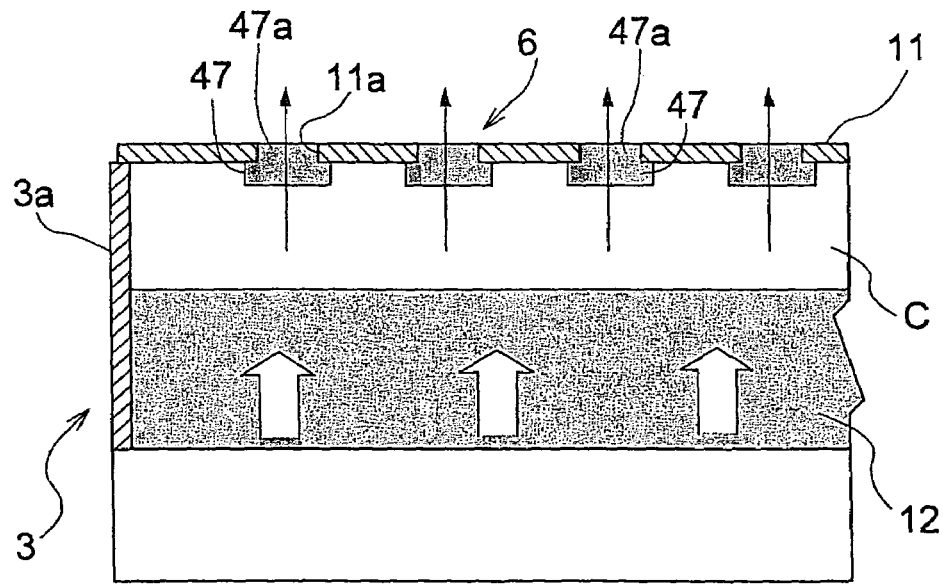
FIG. 16 is a partially magnified sectional view of a screening member according to a separate embodiment.

Also, as described in [a], [b] and [c] above, even if the sub-filter is partially interposed between the porous member and the porous support member in correspondence with the ventilation holes and the through holes, as illustrated above it is also possible to adopt a configuration in which the porous support member is omitted by supporting the filter pieces, the filter pieces with projection, or the interfitting filter pieces by for example adhering them to the porous member with adhesive so as to constitute the screening member using the porous member and the sub-filters. That is to say, taking [b] above as an example, as shown in FIG. 16 it is also possible to adopt a configuration without the porous support member by supporting the filter pieces with projection 47 by adhering them to the porous member 11 with adhesive, for example, to achieve the screening member 6 using the porous member 11 and a plurality of filter pieces with projection 47 (sub-filters). Since the filter pieces with projection and the interfitting filter pieces are shaped to fit into the ventilation holes of the porous member, by adhering them in areas into which they are fitted they can be more strongly adhered.

Figure 23:
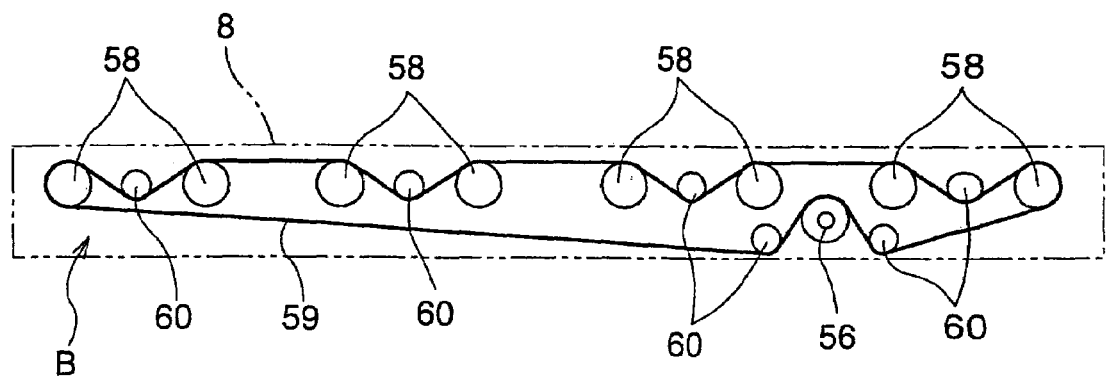
FIG. 23 is a lateral view of the drive force application means of a separate embodiment.
Figure 24:
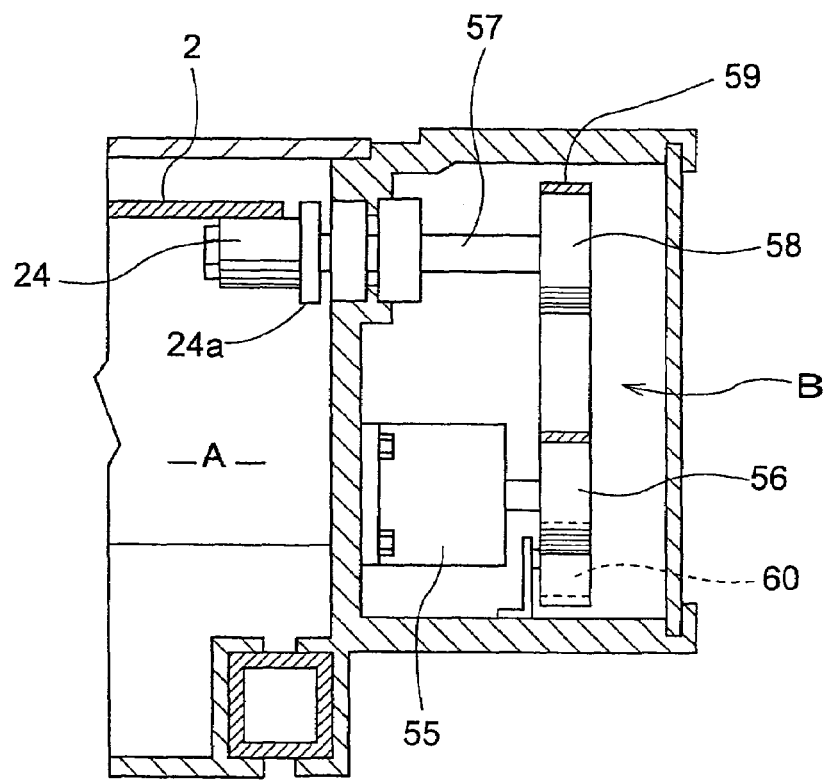
FIG. 24 is a front view of the drive force application means according to a separate embodiment.

(3) As shown in FIGS. 23 and 24, it is also possible for the drive force application means 4 of the first and third embodiments described above to be provided with an electric motor 55, a drive wheel 56 that is rotatively driven by the electric motor 55, driven wheels 58 that are operatively linked via the drive rollers and a rotation shaft 57, a drive transmission belt 59 that transmits motive force from the drive wheel 56 to the driven wheels 58, and free wheels 60 that abut against the inner circumferential side and the outer circumferential side of the drive transmission belt. Then it is possible to arrange the electric motor 55, the drive wheel 56, the driven wheels 58, the drive transmission belt 59, and the free wheels 60 inside the accommodation space B, rotatively support the rotation shaft 57 on the inner wall 8a protruding into the accommodation space B and the transporting space A, provide the driven wheels 58 at portions where the rotation shaft 57 protrudes into the accommodation space B, and provide the drive rollers 9 at portions where the rotation shaft 57 protrudes into the transporting space A.

Figure 25:
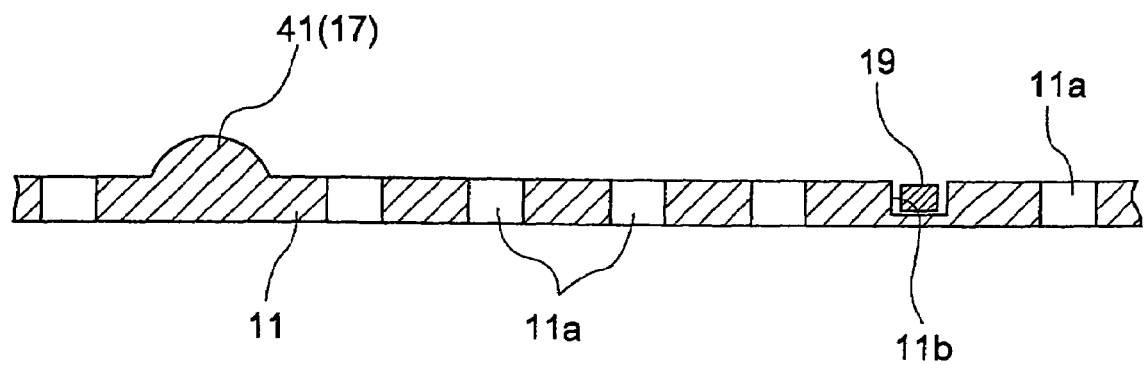
FIG. 25 is a lateral view showing how a support member is supported according to a separate embodiment.
Figure 26A:
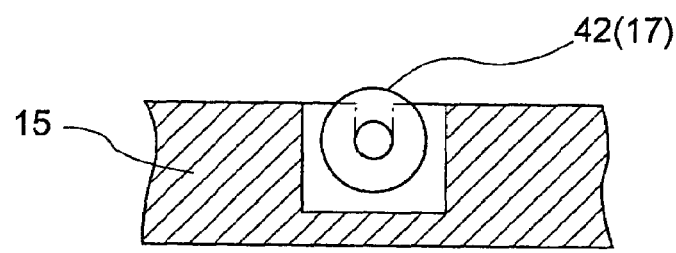
FIGS. 26A and 26B are a lateral view and a perspective view showing how a support member according to a separate embodiment is supported.
Figure 26B:
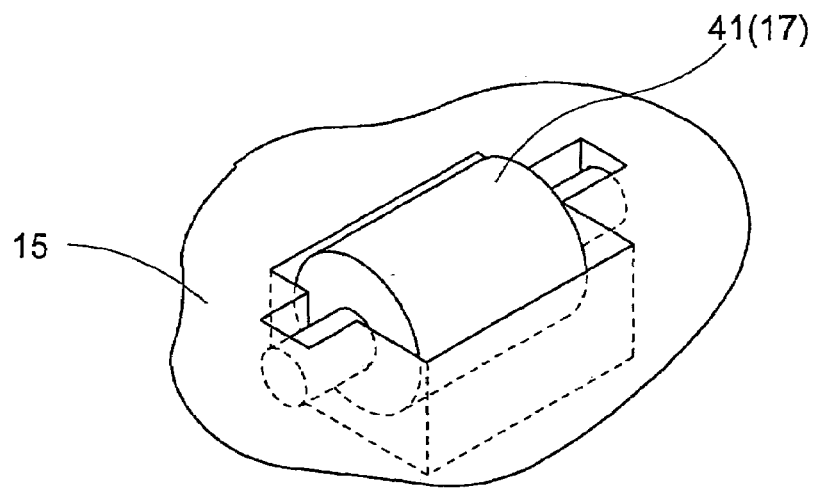

(4) In the third embodiment described above, the support members 17 are provided separate from the porous member 11, but as shown in FIG. 25 it is also possible to adopt a configuration in which a plurality of spherical or near spherical protruding portions 41 are arranged dispersed in the transporting direction and in the width direction in the porous member 11 in a single unit with the porous member 11, and for these plurality of protruding portions 41 to constitute the contact-type support means 17. Furthermore, it is also possible for the contact-type support means 17 to be made of a plurality of rotating rollers 42 capable of rotation in the transporting direction that are arranged dispersed in the transporting direction and in the width direction as shown in FIGS. 26A and 26B.

Figure 27A:
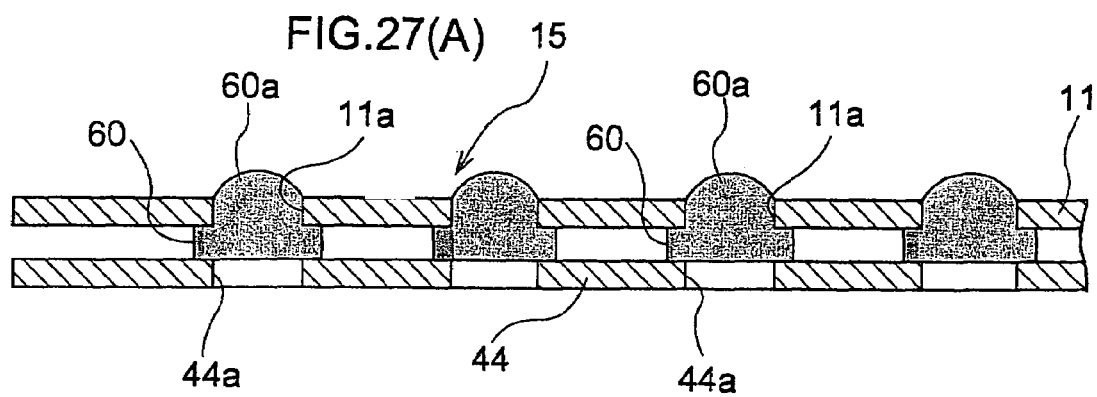
FIGS. 27A, 27B, 27C, 27D, and 27E are sectional views of a porous member of a separate embodiment.

Also, as shown in FIG. 27A, it is also possible to adopt a configuration in which the porous member 11 is constituted by providing a porous member 11 through which purified air that has passed through the dust removal filter 12 can flow, the porous support member 44, and numerous filters 60 sandwiched between the porous member 11 and the porous support member 44 that block the ventilation holes 11a formed in the porous member 11 and the through holes 44a formed in the porous support member 44, and in which the filters 60 protrude from the upper end of the porous member 11 and tip portions 60a of the plurality of filters 60 protruding from the upper end of the porous member 11 function as the contact-type support means 17.

Figure 27B:
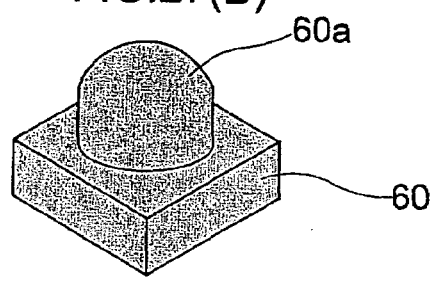

That is, as shown in FIGS. 27A and 27B, the filters 60 are made of protruding portions that fit into the ventilation holes 11a of the porous member 11, the tip portions 60a, of the protruding portions, protruding from the upper surface of the porous member 11 are formed in a convex shape, and the tip portions 60a can support a glass substrate 2 that has been lowered above the upper surface of the air-supplying-type support means 3.

Figure 27C:
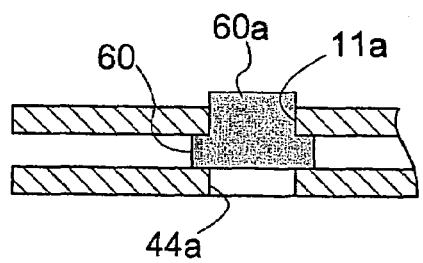
Figure 27D:
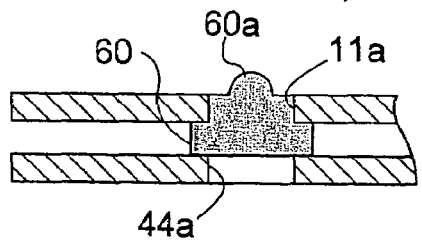
Figure 27E:
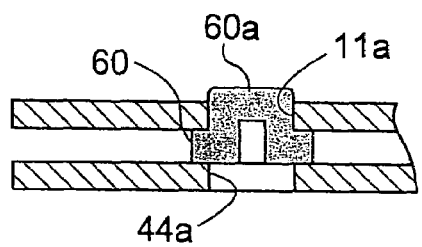

As the filters 60 it is also possible employ filters whose the tip portion 60a is formed flat as shown in FIG. 27C, or filters whose the tip portion 60a is formed by some of the protruding portion being protruded as shown in FIG. 27D. It should be noted that in the case of FIG. 27C, then as shown in FIG. 27E it is also possible to form the filters 60 of FIGS. 27A, 27C and 27D by molding a plate-shaped filter material.

(5) It is also possible for the porous member 11 to cover for example six fan-filter units 14.

(6) In the third embodiment described above, a warning lamp K is provided as warning means and the warning lamp K is flashed, but it is also possible to provide a warning buzzer and activate the warning buzzer to produce a warning sound, or to provide both the warning lamp K and a warning buzzer.

(7) It is also possible to adopt a configuration in which the blowing-type support means is made of the fan-filter units lined up in the transporting direction and the width direction, and by providing distance between fan-filter units lined up in the width direction and or providing distance between fan-filter units lined up in the transporting direction, to form a ventilation duct that discharges the purified air that is supplied to the lower surface of the plate-shaped work piece downwards. Furthermore, it is also possible to form the chamber into a total of six divisions by forming three divisions in the transporting direction in the above embodiments such that it is formed divided into fan-filter units, and forming two divisions in the width direction in the above embodiments such that it is formed divided into blow means units. If the ventilation duct is formed as above, then it is also possible to partition the screening member such that neither the porous member, the sub-filter, or the porous support member are positioned above the ventilation duct, or to configure the screening member such that only the porous member is positioned above the ventilation duct and the sub-filter and the porous support member are not positioned above the ventilation duct.

(8) In the foregoing embodiments, blower fans integrally incorporating a dust-removal filter and air-supplying means in a single unit served as an example, but it is not absolutely necessary that the dust-removal filter and the air-supplying means are integrally attached to one another, and for example it is possible to provide a guide route for guiding air supplied from the air-supplying means to the dust-removal filter so that the dust-removal filter and the air-supplying means can be are provided separately.

(9) The plate-shaped work piece was described as a glass substrate in the foregoing embodiments, but it may also be a semiconductor wafer, for example, and there are no particular limitations to the embodiments as to the shape or size of the supported member.

What is claimed is:

1. A transporting apparatus for a plate-shaped work piece, comprising: air-supplying support means for supplying purified air toward a lower surface of a transported plate-shaped work piece to contactlessly support the plate-shaped work piece;
   wherein the air-supplying support means comprises:
   a dust-removal filter for removing dust;
   air-supplying means for supplying purified air toward the lower surface of the plate-shaped work piece through the dust-removal filter; and
   a screening member for allowing passage of purified air that has passed through the dust-removal filter and for serving as a shield that prevents foreign bodies from falling toward the dust-removal filter wherein the screening member has a porous member that allows purified air that has passed through the dust-removal filter to pass, and one or more sub-filters that substantially cover holes in the porous member,
   wherein a chamber in which the purified air accumulates is formed between the screening member and the dust-removal filter.

2. The transporting apparatus according to claim 1, wherein the screening member is provided with a porous support member positioned on the dust-removal filter side of the sub-filter and supports the sub-filter.

3. The transporting apparatus according to claim 1,
wherein the air-supplying support means is constituted by fan-filter units in which the dust-removal filter and the air-supplying means are incorporated as a single unit with said fan-filter units being lined up in the transporting direction.

4. The transporting apparatus according to claim 1,
wherein a drive force application means for applying a drive force in the transporting direction to the plate-shaped work piece is made by providing a drive rotor for applying a drive force while supporting, in a contacting manner, end portions of the plate-shaped work piece in a horizontal or substantially horizontal state; and
wherein the air-supplying support means supports a portion between the end portions of the plate-shaped work piece.

5. A transporting apparatus for a plate-shaped work piece, comprising:
a frame member having a first bottom;
a housing enclosed within the frame member and having a second bottom member that is spaced apart from the first bottom member;
a filter for removing dust, supported by the second bottom member of on the housing;
an electric fan for supplying air toward the filter, supported on the housing at a position below the filter;
a plate-shaped first porous member disposed above the filter leaving a distance between itself and the filter sufficient to form a chamber in which purified air accumulates;
a plurality of rollers each of which is disposed above the first porous member and is configured to rotate about a shaft extending along a top surface of the first porous member for supporting a bottom surface of the plate-shaped work piece in an abutting manner; and
a motor which drives at least several of the plurality of rollers.

6. The transporting apparatus according to claim 5, further comprising:
a second porous member arranged above the first porous member with an intervening space therebetween.

7. The transporting apparatus according to claim 5, further comprising:
a filter disposed between the first porous member and the second porous member.

8. The transporting apparatus according to claim 5,
wherein a height of the chamber, that is a distance between the filter and the first porous member, is equal to or greater than 1 cm.

9. A transporting apparatus for a plate-shaped work piece, comprising:
air-supplying support means for supplying purified air toward a lower surface of a plate-shaped object to be transported so as to contactlessly support the transported object;
drive force application means for applying a drive force in the transporting direction to the transported object, which is supported by the air-supplying support means; and
contact support means for supporting above an upper surface of the air-supplying support means a transported object that has been lowered to below a set height at which it is supported by the air-supplying support means.

10. The transporting apparatus according to claim 9,
wherein the air-supplying support means are fan-filter units lined up in the transporting direction each of which has a dust-removal filter for removing dust and a blower fan for supplying purified air toward a lower face of the transported object through the dust-removal filter with said dust-removal filter and the blower fan connected into a single unit, and the air-supplying support means further comprises a porous member, above the fan-filter units, for rectifying the purified air supplied to the lower surface of the transported object.

11. The transporting apparatus according to claim 9,
wherein the contact support means is made of a plurality of support members arranged dispersed in the transporting direction and the width direction.

12. The transporting apparatus according to claim 11,
wherein the support members are rotating rollers capable of rotating in the transporting direction.

13. The transporting apparatus according to claim 11,
wherein the support members are spherical or near spherical protruding portions.

14. The transporting apparatus according to claim 11,
wherein the support members are provided in the porous member.

15. The transporting apparatus according to claim 11, further comprising;
detection means for detecting a rotation speed of the blower fan, and
control means for stopping operation of the drive force application means when, based on detection information from the detection means, the rotation speed of the blower fan is less than a set speed.

16. A transporting apparatus for a plate-shaped work piece, comprising:
a housing;
a filter for removing dust, supported on the housing;
an electric fan for supplying air toward the filter, supported on the housing at a position below the filter;
a plate-shaped porous member supported on the housing at a position above the filter;
a plurality of support members supported on the porous member and extending to a level above the porous member, the support members configured so as to abut against a plate-shaped work piece when the plate-shaped work piece drops below a set height;
a plurality of first rollers for abutting against and supporting the plate-shaped work piece at a level above the support members; and
a motor for driving at least several of the plurality of first rollers.

17. The transporting apparatus according to claim 16,
wherein in order to facilitate transport of the plate-shaped work piece in the transporting direction, at least several of the support members are second rollers capable of rotating about a horizontal axis.

18. The transporting apparatus according to claim 1, wherein the one or more sub-filters are inserted into the boles of the porous member.

* * * * *

UNITED STATES PATENT AND TRADEMARK OFFICE
CERTIFICATE OF CORRECTION

| | |
|---|---|
| PATENT NO. | : 7,329,299 B2 |
| APPLICATION NO. | : 10/885210 |
| DATED | : February 12, 2008 |
| INVENTOR(S) | : Susumu Moriya |

It is certified that error appears in the above-identified patent and that said Letters Patent is hereby corrected as shown below:

Column 13, Line 43, Claim 7, "according to claim 5" should read -- according to claim 6 --

Column 14, Line 63, Claim 18, "boles of the porous member" should read -- holes of the porous member --

Signed and Sealed this

Twenty-fourth Day of June, 2008

JON W. DUDAS
*Director of the United States Patent and Trademark Office*